US012712670B2

(12) United States Patent
Tian et al.

(10) Patent No.: US 12,712,670 B2
(45) Date of Patent: Aug. 18, 2026

(54) METHOD FOR INFORMATION TRANSMISSION, SECOND NODE, AND FIRST NODE

(71) Applicant: GUANGDONG OPPO MOBILE TELECOMMUNICATIONS CORP., LTD., Dongguang (CN)

(72) Inventors: Wenqiang Tian, Dongguan (CN); Jia Shen, Dongguan (CN); Zhongda Du, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 426 days.

(21) Appl. No.: 18/349,157

(22) Filed: Jul. 9, 2023

(65) Prior Publication Data

US 2023/0353283 A1 Nov. 2, 2023

Related U.S. Application Data

(63) Continuation of application No. PCT/CN2021/071537, filed on Jan. 13, 2021.

(51) Int. Cl.
*H04L 1/00* (2006.01)

(52) U.S. Cl.
CPC .................................. *H04L 1/0075* (2013.01)

(58) Field of Classification Search
CPC ... H04L 41/0806; H04L 41/16; H04L 1/0072; H04L 1/0045; H04L 1/0026; H04L 25/0254; H04L 1/0041; H04W 24/10; H04W 24/08; G06N 3/04; G06N 3/08; G06N 20/00; H04B 7/0658; H04B 7/0486; H04B 7/0417; H04B 7/0626; H04B 7/0639
See application file for complete search history.

(56) References Cited

U.S. PATENT DOCUMENTS 11,936,452 B2 * 3/2024 Yoo ...................... H04B 7/0639
12,282,111 B2 * 4/2025 Ayyalasomayajula ........................ G01C 21/206
2018/0367192 A1 12/2018 O'Shea et al.
2019/0274108 A1 9/2019 O'Shea et al.
(Continued)

FOREIGN PATENT DOCUMENTS

CN 101103576 1/2008
CN 109066218 12/2018
(Continued)

OTHER PUBLICATIONS

EPO, Extended European Search Report for EP Application No. 21918279.7, Feb. 6, 2024.
(Continued)

*Primary Examiner* — Jung Liu
(74) *Attorney, Agent, or Firm* — Hodgson Russ LLP

(57) ABSTRACT

A method for information transmission is provided in the disclosure. The method for information transmission is applied to a second node in a mobile communication system. The method includes the following. Transmit information of a first model to a first node in the mobile communication system, where the information of the first model is used to set up the first model in the first node. The first model is one of an encoding model and a decoding model matched with the encoding model.

20 Claims, 16 Drawing Sheets

(56) References Cited

U.S. PATENT DOCUMENTS

| | | | | |
|---|---|---|---|---|
| 2021/0273707 | A1* | 9/2021 | Yoo | H04L 1/0045 |
| 2021/0351885 | A1* | 11/2021 | Chavva | G06N 3/04 |
| 2023/0084164 | A1* | 3/2023 | Chen | G06N 3/09 375/267 |
| 2023/0155702 | A1* | 5/2023 | Wang | G06N 3/0495 370/252 |
| 2023/0319617 | A1* | 10/2023 | Manolakos | G06N 3/0464 370/328 |
| 2023/0328559 | A1* | 10/2023 | Manolakos | H04L 41/0806 370/252 |
| 2024/0106507 | A1* | 3/2024 | Lee | G06N 3/098 |
| 2024/0129008 | A1* | 4/2024 | Yoo | H04B 7/0658 |

FOREIGN PATENT DOCUMENTS

| | | |
|---|---|---|
| CN | 110249342 | 9/2019 |
| EP | 3591586 | 1/2020 |
| WO | 2020180221 | 9/2020 |

OTHER PUBLICATIONS

WIPO, International Search Report and Written Opinion for International Application No. PCT/CN2021/071537, Oct. 13, 2021.

EPO, Communication for EP Application No. 21918279.7, Jan. 7, 2026.

* cited by examiner

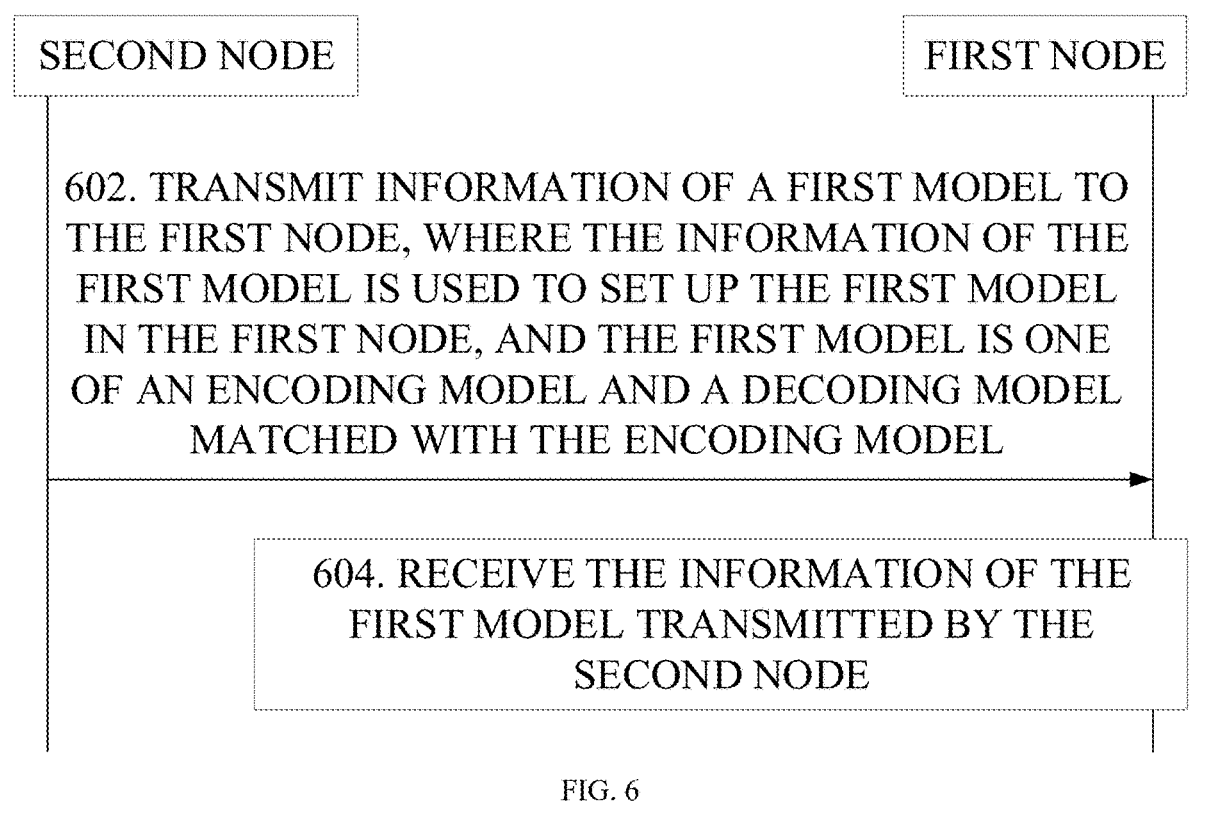

SECOND NODE

FIRST NODE

602. TRANSMIT INFORMATION OF A FIRST MODEL TO THE FIRST NODE, WHERE THE INFORMATION OF THE FIRST MODEL IS USED TO SET UP THE FIRST MODEL IN THE FIRST NODE, AND THE FIRST MODEL IS ONE OF AN ENCODING MODEL AND A DECODING MODEL MATCHED WITH THE ENCODING MODEL

604. RECEIVE THE INFORMATION OF THE FIRST MODEL TRANSMITTED BY THE SECOND NODE

FIG. 6

Figure 7:
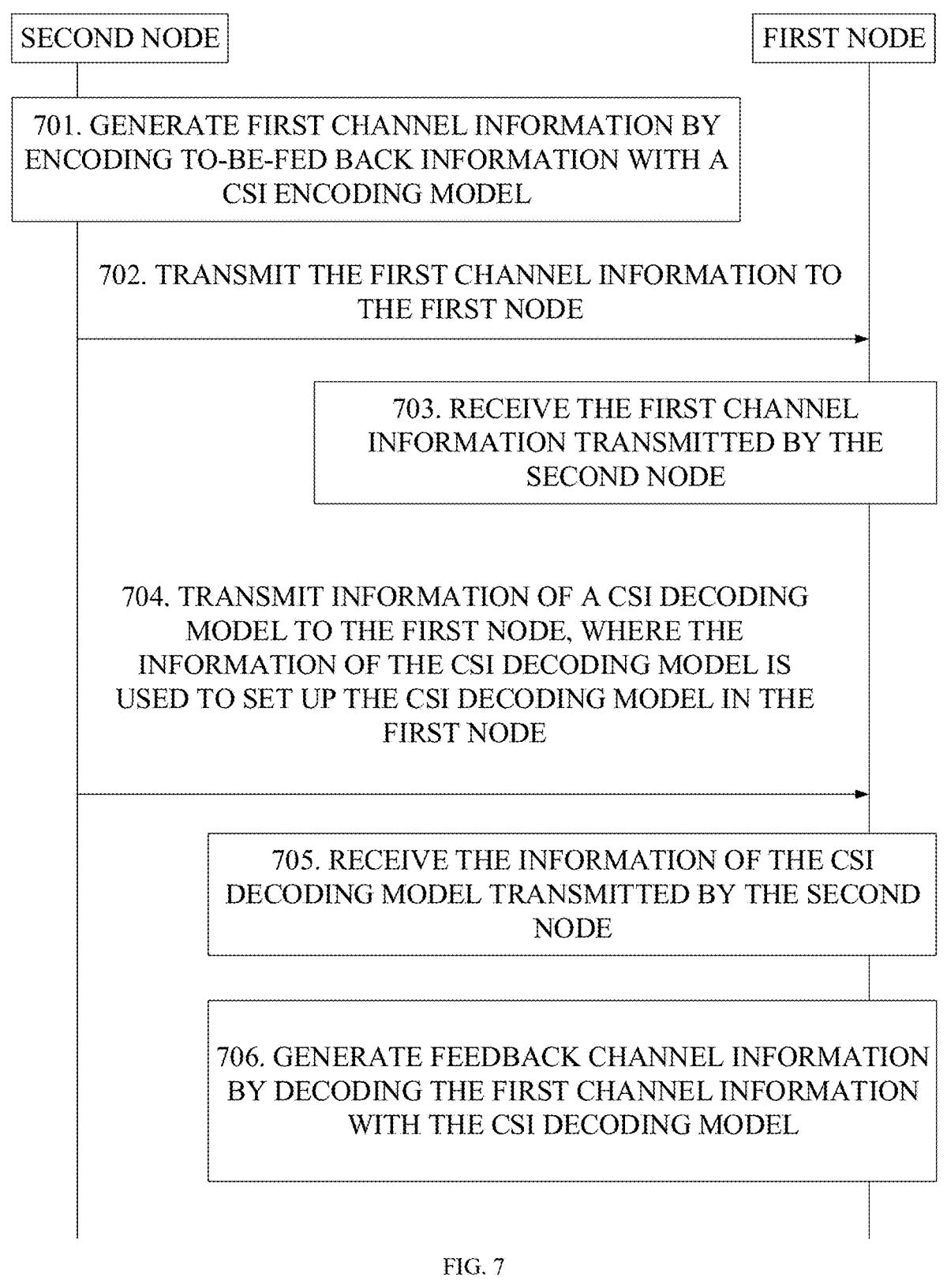

SECOND NODE

FIRST NODE

701. GENERATE FIRST CHANNEL INFORMATION BY ENCODING TO-BE-FED BACK INFORMATION WITH A CSI ENCODING MODEL

702. TRANSMIT THE FIRST CHANNEL INFORMATION TO THE FIRST NODE

703. RECEIVE THE FIRST CHANNEL INFORMATION TRANSMITTED BY THE SECOND NODE

704. TRANSMIT INFORMATION OF A CSI DECODING MODEL TO THE FIRST NODE, WHERE THE INFORMATION OF THE CSI DECODING MODEL IS USED TO SET UP THE CSI DECODING MODEL IN THE FIRST NODE

705. RECEIVE THE INFORMATION OF THE CSI DECODING MODEL TRANSMITTED BY THE SECOND NODE

706. GENERATE FEEDBACK CHANNEL INFORMATION BY DECODING THE FIRST CHANNEL INFORMATION WITH THE CSI DECODING MODEL

Figure 9:
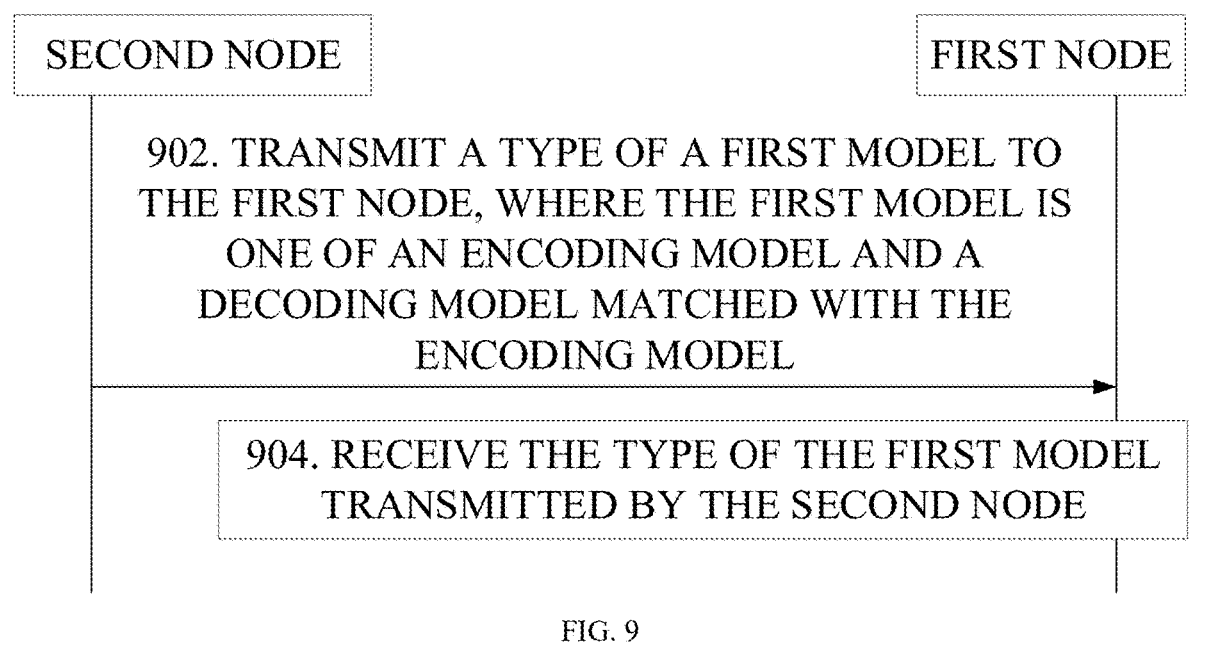

SECOND NODE

FIRST NODE

902. TRANSMIT A TYPE OF A FIRST MODEL TO THE FIRST NODE, WHERE THE FIRST MODEL IS ONE OF AN ENCODING MODEL AND A DECODING MODEL MATCHED WITH THE ENCODING MODEL

904. RECEIVE THE TYPE OF THE FIRST MODEL TRANSMITTED BY THE SECOND NODE

METHOD FOR INFORMATION TRANSMISSION, SECOND NODE, AND FIRST NODE

CROSS-REFERENCE TO RELATED APPLICATION(S)

This application is a continuation of International Application No. PCT/CN2021/071537, filed Jan. 13, 2021, the entire disclosure of which is hereby incorporated by reference.

TECHNICAL FIELD

This disclosure relates to the field of mobile communication, and in particular, to a method for information transmission, a second node, and a first node.

BACKGROUND

In mobile communication systems, information exchange between nodes is usually realized according to theoretical modeling and parameter selection for actual communication environments.

In the related art, information exchange between various nodes in a mobile communication system can also be realized with an encoding model and a decoding model. For example, for channel state information (CSI) acquisition and indication, a first node in the mobile communication system generates first channel information by encoding to-be-fed back channel information with an encoding model, and transmits the first channel information to a second node. The second node generates feedback channel information by decoding the first channel information with a decoding model.

In the case where an encoding model and a decoding model are used, an encoding model and a decoding model matched with the encoding model need to be provided for two nodes involved in information exchange, respectively. Due to different manufacturers of the two nodes or due to that encoding models and/or decoding models for the two nodes are different, there is no encoding model and decoding model that are matched with each other for the two nodes to perform information exchange.

SUMMARY

A method for information transmission, a first node, and a second node are provided in implementations of the disclosure.

According to an aspect of the disclosure, a method for information transmission is provided. The method is applicable to a second node in a mobile communication system and includes the following. Transmit information of a first model to a first node in the mobile communication system, where the information of the first model is used to set up the first model in the first node. The first model is one of an encoding model and a decoding model matched with the encoding model.

According to an aspect of the disclosure, a second node is provided. The second node is in a mobile communication system and includes a transceiver, a processor coupled with the transceiver, and a memory storing a computer program. The processor is configured to execute the computer program to cause the transceiver to transmit information of a first model to a first node in the mobile communication system, where the information of the first model is used to set up the first model in the first node. The first model is one of an encoding model and a decoding model matched with the encoding model.

According to an aspect of the disclosure, a first node is provided. The first node is in a mobile communication system and includes a transceiver, a processor coupled with the transceiver, and a memory storing a computer program. The processor is configured to execute the computer program to cause the transceiver to receive information of a first model transmitted by a second node in the mobile communication system, where the information of the first model is used to set up the first model in the first node. The first model is one of an encoding model and a decoding model matched with the encoding model.

BRIEF DESCRIPTION OF THE DRAWINGS

In order to describe technical solutions in implementations of the disclosure more clearly, the following will give a brief introduction to accompanying drawings required for describing implementations. Apparently, the accompanying drawings hereinafter described merely illustrate some implementations of the disclosure. Based on these drawings, those of ordinary skills in the art can also obtain other drawings without creative effort.

FIG. 6 is a flow chart illustrating a method for information transmission provided in an exemplary implementation of the disclosure.

FIG. 7 is a flow chart illustrating a method for information transmission provided in an exemplary implementation of the disclosure.

FIG. 8 is a flow chart illustrating a method for information transmission provided in an exemplary implementation of the disclosure.

FIG. 9 is a flow chart illustrating a method for information transmission provided in an exemplary implementation of the disclosure.

FIG. 11 is a flow chart illustrating a method for information transmission provided in an exemplary implementation of the disclosure.

FIG. 13 is a flow chart illustrating a method for information transmission provided in an exemplary implementation of the disclosure.

DETAILED DESCRIPTION

In order to make purposes, technical solutions, and advantages of the disclosure clearer, the following will further describe in detail implementations of the disclosure with reference to accompanying drawings.

First of all, briefly introduce terms involved in implementations of the disclosure.

Channel State Information (CSI)

CSI is used to describe a channel property of a communication link. CSI indication is significantly important in a communication system, as the CSI indication determines a performance of multiple-input multiple-output (MIMO) transmission. Generally, a CSI indication in a communication system may include indications for a channel quality indicator (CQI), a precoding matrix indicator (PMI), a rank indicator (RI), and other information.

Figure 1:
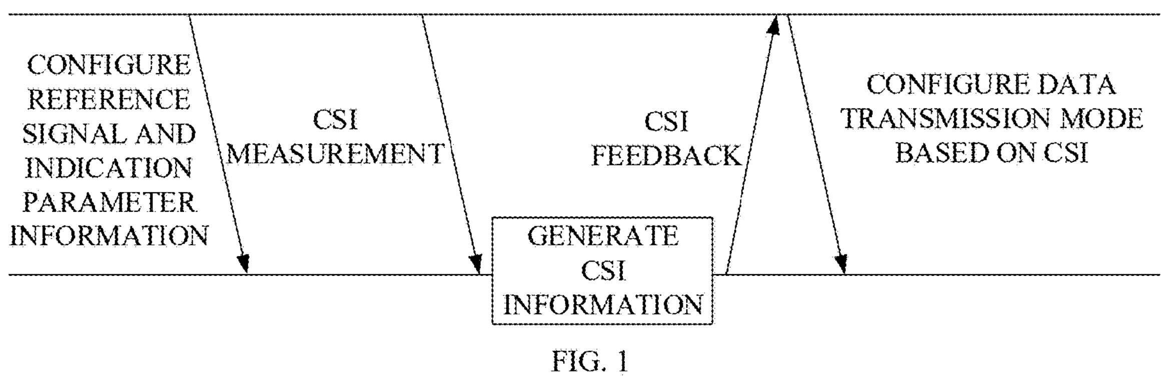
FIG. 1 is a schematic diagram illustrating a process of channel state information (CSI) generation and indication provided in an exemplary implementation of the disclosure.

Referring to FIG. 1, a CSI generation and indication manner is exemplarily illustrated. As illustrated in FIG. 1, in the process, a network device first configures indication parameter information for CSI indication, for example, which information in a CQI, a PMI, an RI, etc. needs to be indicated by a terminal device. Meanwhile, some reference signals for CSI measurement, such as a synchronization signal block (SSB) and/or a channel state information-reference signal (CSI-RS) can be configured for the terminal device. The terminal device determines the current CSI condition by performing CSI measurement with the above reference signals, and determines the indication parameter information and indicates the current CSI to a base station, so that the network device can configure a reasonable and efficient data transmission mode based on the current channel condition.

Artificial Intelligence (AI)

In recent years, AI research represented by neural networks has achieved great results in many fields, and will have a significant impact on production and life of people for a long time in the future.

Figure 2:
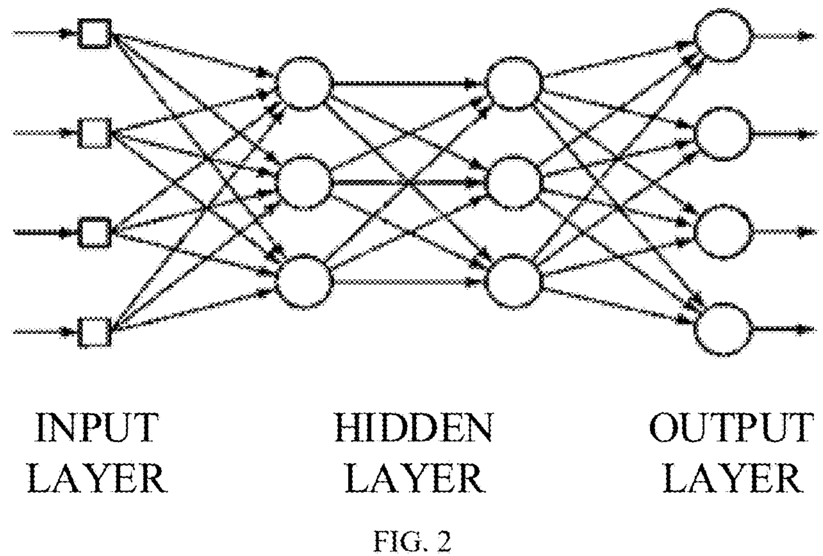
FIG. 2 is a schematic diagram of a neural network provided in an exemplary implementation of the disclosure.

Referring to FIG. 2, FIG. 2 is a schematic diagram of a neural network provided in an implementation of the disclosure. As illustrated in FIG. 2, a basic structure of a simple neural network includes an input layer, a hidden layer, and an output layer. The input layer is responsible for data reception, the hidden layer is responsible for data processing, and a final result is generated at the output layer. As illustrated in FIG. 2, each node represents a processing unit, which can also be considered as simulation of a neuron. Multiple neurons form a layer of the neural network, and information transmission and processing of multiple layers construct a whole neural network.

With continuous development of neural network research, in recent years, neural-network deep-learning algorithms have been proposed, and more hidden layers have been introduced. Feature learning is performed by training a neural network with multiple hidden layers layer by layer, so that learning and processing capabilities of the neural network are significantly improved, and the neural network is widely applicable in pattern recognition, signal processing, optimization combination, anomaly detection, and other fields.

Figure 3:
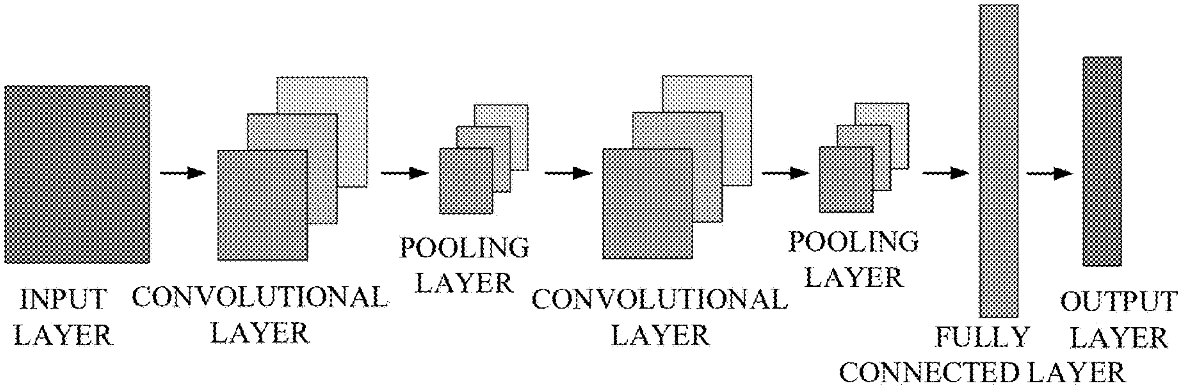
FIG. 3 is a schematic diagram of a convolutional neural network provided in an exemplary implementation of the disclosure.

Meanwhile, with development of deep learning, convolutional neural networks have been further researched. Referring to FIG. 3, FIG. 3 is a schematic diagram of a convolutional neural network provided in an implementation of the disclosure. As illustrated in FIG. 3, a basic structure of the convolutional neural network includes an input layer, multiple convolutional layers, multiple pooling layers, a fully connected layer, and an output layer. With the introduction of the convolutional layers and the pooling layers, a dramatic increase of network parameters can be effectively controlled, the number of parameters is limited, and characteristics of a local structure are explored, thereby improving robustness of the algorithm.

A neural network is used for CSI indication.

Currently, basic principles of a mobile communication system are mostly based on theoretical modeling and parameter selection for an actual communication environment. As requirements for flexibility, adaptability, rate, capacity, etc., of the mobile communication system continue to increase, gains brought by an operating mode of the classical-model-theory-based conventional mobile communication system are gradually weakening. At present, some new researches for these issues are gradually carried out, where use of AI for CSI acquisition and indication is one of the new researches.

Figure 4:
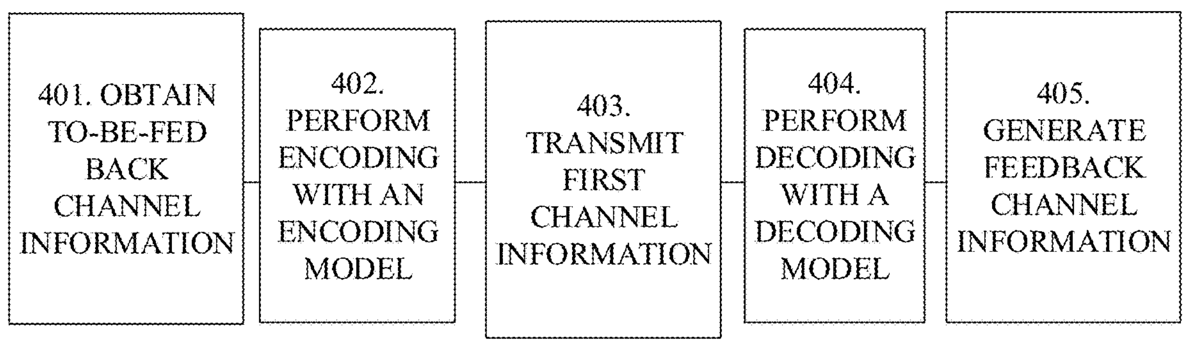
FIG. 4 is a schematic diagram of a network architecture with a neural network model for CSI indication provided in an exemplary implementation of the disclosure.

Referring to FIG. 4, FIG. 4 illustrates a basic network architecture with a neural network model for CSI indication. The method includes the following.

At 401, an encoding end obtains to-be-fed back channel information.

At 402, the encoding end generates first channel information by performing encoding with an encoding model. The first channel information is used for CSI indication.

At 403, the encoding end transmits the first channel information to a decoding end.

At 404, the decoding end performs decoding with a decoding model.

At 405, the decoding end generates feedback channel information. The feedback channel information is used for channel quality information recovery.

Figure 5:
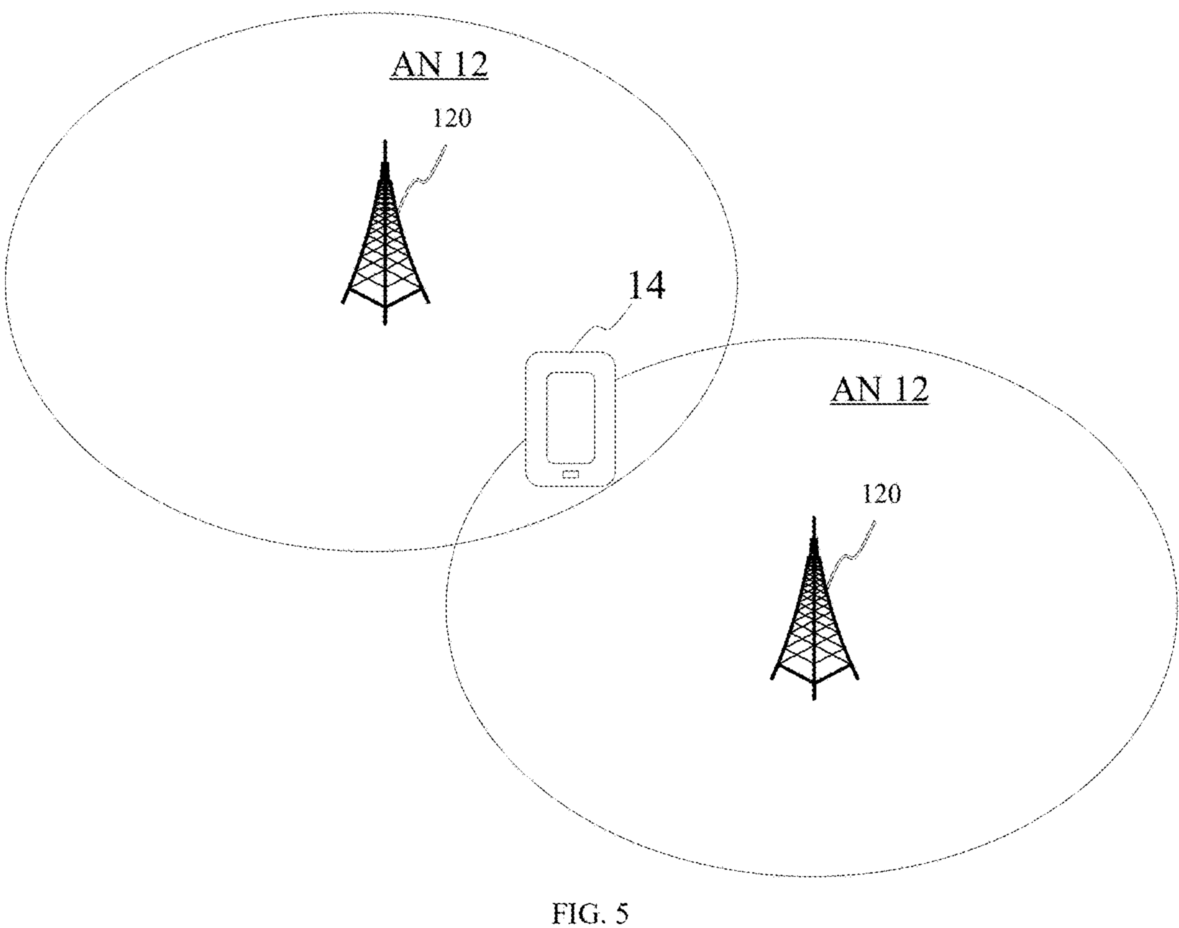
FIG. 5 is a block diagram of a communication system provided in an exemplary implementation of the disclosure.

FIG. 5 is a block diagram of a communication system provided in an exemplary implementation of the disclosure. The communication system may include an access network (AN) 12 and a terminal device 14.

The AN 12 includes multiple network devices 120. The network device 120 may be a base station, where the base station is an apparatus that is deployed in the AN and used to provide a wireless communication function for the terminal device. The base station may include various forms of macro base stations, micro base stations, relay stations, access points (AP), etc. In systems with different radio access technologies, devices with a base-station function may have different names, for example, eNodeB (eNB) in a long-term evolution (LTE) system, or a gNodeB (gNB) in a fifth generation (5G) NR-based access to unlicensed spectrum (NR-U) system. With evolution of communication technology, description of "base station" may be changed. For sake of convenience in implementations of the disclosure, the above apparatuses for providing wireless communication functions for the terminal device 14 are collectively referred to as network devices.

The terminal device 14 may include various devices with a wireless communication function such as handheld devices, in-vehicle devices, wearable devices, and computing devices, or other processing devices coupled with a wireless modem, as well as various forms of UEs, mobile stations (MSs), terminal devices, and the like. For convenience of illustration, the above-mentioned devices are collectively referred to as terminal devices. The network device 120 communicates with the terminal device 14 through a certain air-interface technology, such as a Uu interface.

Technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS), an LTE system, an LTE frequency division duplex (FDD) system, an LTE time division duplex (TDD) system, an advanced LTE (LTE-A) system, an NR system, an evolved system of the NR system, an LTE-based access to unlicensed spectrum (LTE-U) system, an NR-U system, a universal mobile telecommunication system (UMTS), a worldwide interoperability for microwave access (WiMAX) communication system, a wireless local area network (WLAN), a wireless fidelity (WiFi), a 6th generation (6G) system, a next-generation communication system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), vehicle to vehicle (V2V) communication, and a vehicle to everything (V2X) system. Implementations of the disclosure can also be applicable to these communication systems.

FIG. 6 is a flow chart illustrating a method for information transmission provided in an exemplary implementation of the disclosure. The method includes information transmission and information reception. For example, the above method is applicable to a mobile communication system in implementations of the disclosure, where the mobile communication system includes a first node and a second node. The method includes the following.

At 602, the second node transmits information of a first model to the first node in the mobile communication system.

The information of the first model is used to set up the first model in the first node. The first model is one of an encoding model and a decoding model matched with the encoding model.

In the mobile communication system, there are several network devices and terminal devices, and the network devices and the terminal devices each can be assigned as the first node or the second node. Exemplarily, the first node is one of a network device and a terminal device, and the second node is the other of the network device and the terminal device. For example, the first node is a network device and the second node is a terminal device; the first node is a terminal device and the second node is a network device; the first node is a first terminal device and the second node is a second terminal device; or the first node is a first network device and the second node is a second network device.

The encoding model refers to a model used for encoding original information to generate transmissible information. The decoding model refers to a model used for decoding received transmissible information to generate the original information.

Exemplarily, the encoding model and the decoding model matched with the encoding model include, but are not limited to, at least one group of: a CSI encoding model and a CSI decoding model; a channel encoding model and a channel decoding model; a source encoding model and a source decoding model; or a modulation model and a demodulation model.

The CSI encoding model and the CSI decoding model are used to compress and recover relevant information in CSI. The channel encoding model and the channel decoding model are used to compress and recover relevant information of a channel. The source encoding model and the source decoding model are used to compress and recover relevant information of an information source. The modulation model and the demodulation model are used to compress and recover information in a signal. For example, the first model is the CSI encoding model. For another example, the first model is the source decoding model.

In the mobile communication system, to achieve information exchange between the first node and the second node, an encoding model and a decoding model matched with the encoding model are required. Exemplarily, in the method for information transmission and the method for information reception provided in implementations of the disclosure, the second node is provided with a second model, where the second model is the other of the encoding model and the decoding model matched with the encoding model. For example, in the case where the encoding model is the CSI encoding model and the decoding model matched with the encoding model is the CSI decoding model, the first model is the CSI encoding model, and the second model is the CSI decoding model. For another example, in the case where the encoding model is the modulation model and the decoding model matched with the encoding model is the demodulation model, the first model is the demodulation model, and the second model is the modulation model.

In implementations of the disclosure, for example, the encoding model and the decoding model matched with the encoding model are neural network models.

Exemplarily, the information of the first model includes, but is not limited to, at least one of: a type of the first model, a model parameter of the first model, or the first model and interface information of the first model.

The type of the first model refers to a type of the neural network model, and the neural network model can be classified according to actual needs. The model parameter of the first model includes, but is not limited to, at least one of: a structure of a neural network, a network coefficient of the neural network, an algorithm of the neural network, or interface information of the neural network. The interface information of the first model includes, but is not limited to, at least one of: information of an input interface of the first model, or information of an output interface of the first model. Exemplarily, the information of the input interface of the first model includes dimension information input to the first model, and the information of the output interface includes dimension information output from the first model. The dimension information input to the first model and the dimension information output from the first model include, but are not limited to, at least one of: a data type, a dimension type, a dimension quantity, a dimension size, a range of each input, a normalization processing method, or a quantization scheme. Relevant contents of the above information of the first model will be described in detail below.

For example, a type of a CSI decoding model transmitted from the second node in the mobile communication system to the first node is a convolutional neural network. For another example, a model parameter of a channel encoding model transmitted from the second node in the mobile communication system to the first node is interface information of the convolutional neural network. For yet another example, the second node in the mobile communication system transmits a source decoding model and information of an input interface of the source decoding model to the first node, where the information of the input interface of the source decoding model includes a dimension quantity and a quantization scheme.

According to different types of nodes, the information of the first model can be transmitted from the second node to the first node in different transmission modes, where the following optional transmission modes can be included.

In the case where the second node is a network device, and the first node is a terminal device, the information of the first model can be transmitted through at least one of: a system broadcast message, a system information block (SIB), radio resource control (RRC), RRC reconfiguration signaling, downlink control information (DCI), a medium access control control element (MAC CE), a physical downlink control channel (PDCCH), a physical downlink share channel (PDSCH), or data information.

In the case where the second node is a terminal device, and the first node is a network device, the information of the first model can be transmitted through at least one of: an RRC message, uplink control information (UCI), a PUCCH, a PUSCH, or data information.

In the case where the first node is a first terminal device, and the second node is a second terminal device, the information of the first model can be transmitted through direct communication (sidelink).

At 604, the first node receives the information of the first model transmitted by the second node in the mobile communication system.

The information of the first model is used to set up the first model in the first node. The first model is one of an encoding model and a decoding model matched with the encoding model.

Exemplarily, the first node is one of a network device and a terminal device, and the second node is the other of the network device and the terminal device.

Exemplarily, the encoding model and the decoding model matched with the encoding model include, but are not limited to, at least one group of: a CSI encoding model and a CSI decoding model; a channel encoding model and a channel decoding model; a source encoding model and a source decoding model; or a modulation model and a demodulation model.

In the mobile communication system, to achieve information exchange between the first node and the second node, an encoding model and a decoding model matched with the encoding model are required. Exemplarily, the second node is provided with a second model, where the second model is the other of the encoding model and the decoding model matched with the encoding model. For example, in the case where the encoding model is the CSI encoding model and the decoding model matched with the encoding model is the CSI decoding model, the first model is the CSI encoding model, and the second model is the CSI decoding model. For another example, in the case where the encoding model is the modulation model and the decoding model matched with the encoding model is the demodulation model, the first model is the demodulation model, and the second model is the modulation model.

In implementations of the disclosure, for example, the encoding model and the decoding model matched with the encoding model are neural network models.

Exemplarily, the information of the first model includes, but is not limited to, at least one of: a type of the first model, a model parameter of the first model, or the first model and interface information of the first model.

For example, the type of the CSI decoding model received from the second node by the first node in the mobile communication system is the convolutional neural network. For another example, the model parameter of the channel encoding model received from the second node by the first node in the mobile communication system is the interface information of the convolutional neural network.

In summary, with the method for information transmission and the method for information reception provided in implementations of the disclosure, the second node in the mobile communication system transmits the information of the first model to the first node, so that the first node can set up in the first node the first model that matches the second model set up in the second node, according to the received information of the first model. As such, the encoding model and the decoding model matched with the encoding model can be provided for the first node and the second node, respectively, thereby implementing information exchange between the first node and the second node.

For example, for the case where an encoding model is a CSI encoding model and a decoding model matched with the encoding model is a CSI decoding model, two optional implementations are illustrated as follows.

Exemplarily, as illustrated in FIG. 7, for example, a first model is the CSI decoding model, and a second model is the CSI encoding model. For example, the above method is applicable to a mobile communication system in implementations of the disclosure, where the mobile communication system includes a second node and a first node. The method includes the following.

At 701, the second node generates first channel information by encoding to-be-fed back information with the CSI encoding model.

At 702, the second node transmits the first channel information to the first node.

At 703, the first node receives the first channel information transmitted by the second node.

Exemplarily, the first channel information is generated by encoding the to-be-fed back information. In other words, the first channel information is generated by encoding the to-be-fed back information with the CSI encoding model. The to-be-fed back information refers to relevant information in CSI, where the relevant information includes, but is not limited to, at least one of: a CQI, a PMI, or an RI.

For example, the second node is a network device, the first node is a terminal device, and the network device is provided with a CSI encoding model. The network device generates the first channel information by encoding the to-be-fed back information with the CSI encoding model, and transmits the first channel information to the terminal device. The terminal device receives the first channel information.

At 704, the second node transmits information of the CSI decoding model to the first node.

The information of the CSI decoding model is used to set up the CSI decoding model in the first node.

Exemplarily, the first node is one of a network device and a terminal device, and the second node is the other of the network device and the terminal device. For example, the first node is a network device and the second node is a terminal device; the first node is a terminal device and the second node is a network device; the first node is a first terminal device and the second node is a second terminal device; or the first node is a first network device and the second node is a second network device.

Exemplarily, the second node is provided with the CSI encoding model, and the CSI encoding model and the CSI decoding model are matched with each other.

Exemplarily, the information of the CSI decoding model includes, but is not limited to, at least one of: a type of the CSI decoding model, a model parameter of the CSI decoding model, or the CSI decoding model and interface information of the CSI decoding model.

At 705, the first node receives the information of the CSI decoding model transmitted by the second node.

The information of the CSI decoding model is used to set up the CSI decoding model in the first node.

Exemplarily, the operations at 704 and 705 are similar to the operations at 602 and 604, and reference can be made to the operations at 602 and 604, which will not be repeated herein.

Exemplarily, the information of the first model can be transmitted from the second node to the first node in the following optional modes.

In the case where the second node is a network device, and the first node is a terminal device, the information of the first model can be transmitted through at least one of: a system broadcast message, an SIB, RRC, RRC reconfiguration signaling, DCI, an MAC CE, a PDCCH, a PDSCH, or data information.

In the case where the second node is a terminal device, and the first node is a network device, the information of the first model can be transmitted through at least one of: an RRC message, UCI, a PUCCH, a PUSCH, or data information.

In the case where the first node is a first terminal device, and the second node is a second terminal device, the information of the first model can be transmitted through sidelink.

At 706, the first node generates feedback channel information by decoding the first channel information with the CSI decoding model.

For example, the second node is a network device, and the first node is a terminal device. The network device transmits the CSI decoding model and the interface information of the CSI decoding model to the terminal device. After the terminal device receives the CSI decoding model and the interface information, the terminal device generates the feedback channel information by decoding the first channel information with the CSI decoding model.

In summary, in implementations of the disclosure, for example, the encoding mode is the CSI encoding model, and the decoding model matched with the encoding model is the CSI decoding model. The second node in the mobile communication system transmits the information of the first model to the first node, so that the first node can set up in the first node the first model that matches the second model set up in the second node, according to the received information of the first model. That is, the CSI encoding model and the CSI decoding model matched with the CSI encoding model can be provided for the first node and the second node, respectively, thereby implementing transmission and reception of CSI between the first node and the second node.

Figure 8:
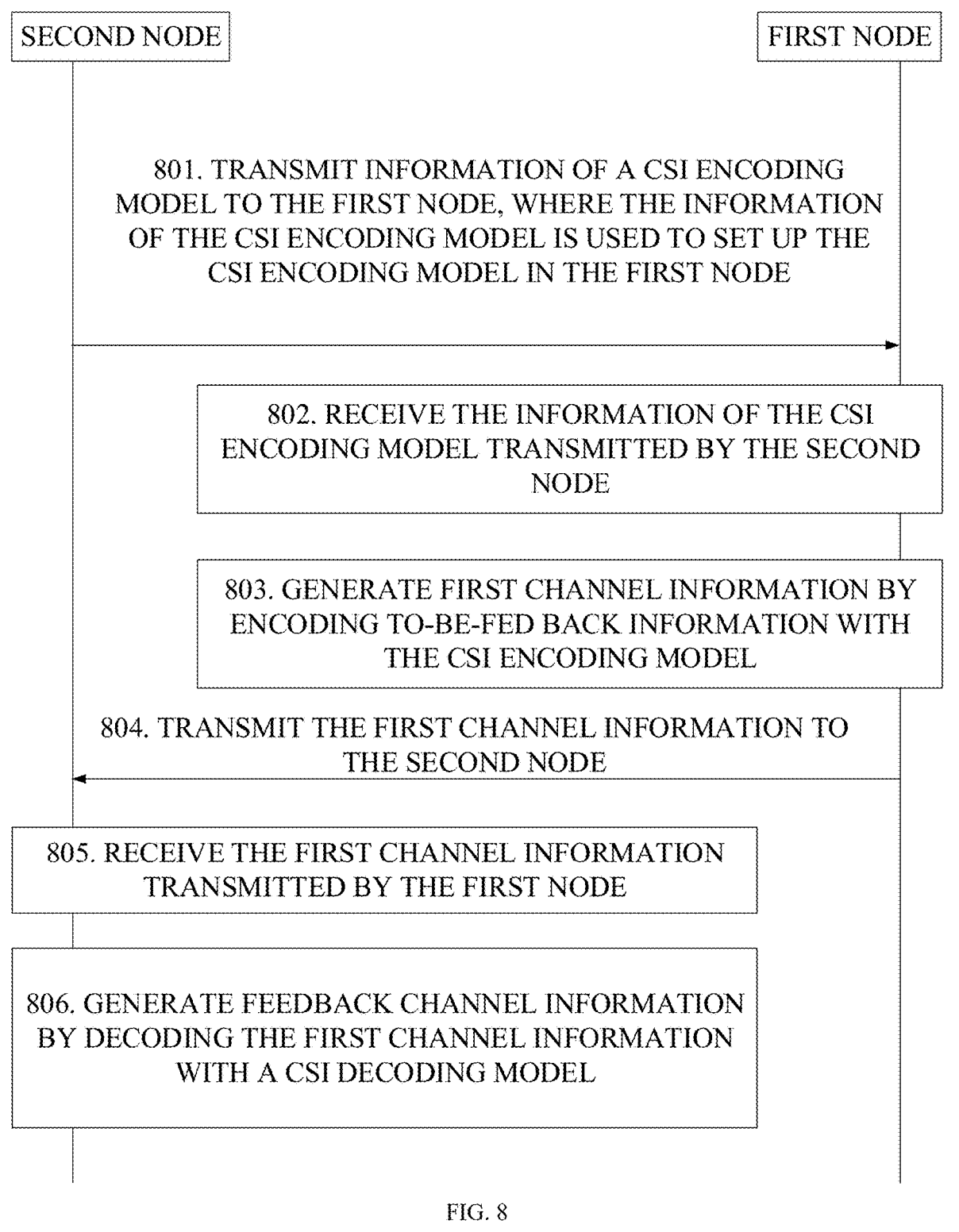

Exemplarily, as illustrated in FIG. 8, for example, a first model is the CSI encoding model, and a second model is the CSI decoding model. For example, the above method is applicable to a mobile communication system in implementations of the disclosure, where the mobile communication system includes a second node and a first node. The method includes the following.

At 801, the second node transmits information of the CSI encoding model to the first node.

At 802, the first node receives the information of the CSI encoding model transmitted by the second node.

The information of the CSI encoding model is used to set up the CSI encoding model in the first node.

Exemplarily, the first node is provided with the CSI decoding model, and the CSI encoding model and the CSI decoding model are matched with each other.

Exemplarily, the information of the CSI encoding model includes, but is not limited to, at least one of: a type of the CSI encoding model, a model parameter of the CSI encoding model, or the CSI encoding model and interface information of the CSI encoding model.

Exemplarily, the information of the first model can be transmitted from the second node to the first node in the following optional modes.

In the case where the second node is a network device, and the first node is a terminal device, the information of the first model can be transmitted through at least one of: a system broadcast message, an SIB, RRC, RRC reconfiguration signaling, DCI, an MAC CE, a PDCCH, a PDSCH, or data information.

In the case where the second node is a terminal device, and the first node is a network device, the information of the first model can be transmitted through at least one of: an RRC message, UCI, a PUCCH, a PUSCH, or data information.

In the case where the second node is a first terminal device, and the first node is a second terminal device, the information of the first model can be transmitted through sidelink.

Exemplarily, the operations at 801 and 802 are similar to the operations at 602 and 604, and reference can be made to the operations at 602 and 604, which will not be repeated herein.

At 803, the first node generates first channel information by encoding to-be-fed back information with the CSI encoding model.

Exemplarily, the first channel information is generated by encoding the to-be-fed back information. In other words, the first channel information is generated by encoding the to-be-fed back information with the CSI encoding model. The to-be-fed back information refers to relevant information in CSI, where the relevant information includes, but is not limited to, at least one of: a CQI, a PMI, or an RI.

For example, the second node is a network device, and the first node is a terminal device. The network device transmits the model parameter of the CSI encoding model to the terminal device. After the terminal device receives the model parameter of the CSI encoding model, the terminal device generates the first channel information by encoding the to-be-fed back information with the CSI encoding model.

At 804, the first node transmits the first channel information to the second node.

At 805, the second node receives the first channel information transmitted by the first node.

At 806, the second node generates feedback channel information by decoding the first channel information with the CSI decoding model.

For example, the second node is a network device, where the network device is provided with a CSI decoding model. The network device obtains the feedback channel information by decoding the received first channel information with the CSI decoding model.

In summary, in implementations of the disclosure, for example, the encoding model is the CSI encoding model, and the decoding model matched with the encoding model is the CSI decoding model. The second node in the mobile communication system transmits the information of the first model to the first node, so that the first node can set up in the first node the first model that matches the second model set up in the second node, according to the received information of the first model. That is, the CSI encoding model and the CSI decoding model matched with the CSI encoding model can be provided for the first node and the second node, respectively, thereby implementing transmission and reception of CSI between the first node and the second node.

According to the above contents, the information of the first model includes, but is not limited to, at least one of: a type of the first model, a model parameter of the first model, or the first model and interface information of the first model. According to the contents of the information of the first model, several optional methods for information transmission and methods for information reception are provided in implementations of the disclosure.

1. The Information of the First Model Includes the Type of the First Model.

FIG. 9 is a flow chart illustrating a method for information transmission provided in an exemplary implementation of the disclosure. For example, the above method is applicable to a mobile communication system in implementations of the disclosure, where the mobile communication system includes a first node and a second node. The method includes the following.

At 902, the second node transmits the type of the first model to the first node in the mobile communication system.

At 904, the first node receives the type of the first model transmitted by the second node in the mobile communication system.

The type of the first model is used to determine the first model used in the first node, and the first model is one of an encoding model and a decoding model matched with the encoding model.

Exemplarily, the first node is one of a network device and a terminal device, and the second node is the other of the network device and the terminal device.

Exemplarily, the encoding model and the decoding model matched with the encoding model include, but are not limited to, at least one group of: a CSI encoding model and a CSI decoding model; a channel encoding model and a channel decoding model; a source encoding model and a source decoding model; or a modulation model and a demodulation model.

Exemplarily, for transmission modes of the type of the first model, reference can be made to the above-mentioned contents, which will not be repeated herein.

Exemplarily, after the first node receives the type of the first model transmitted by the second node, the first node determines a model of a specified type as the first model in the first node, and determines a corresponding model parameter of the first model according to the specified model type. The model parameter of the first model includes, but is not limited to, at least one of: a structure of a neural network, a network coefficient of the neural network, an algorithm of the neural network, or interface information of the neural network.

For example, the second node is a first terminal device, the first node is a second terminal device, and a type of a channel encoding model transmitted from the first terminal device to the second terminal device is a convolutional neural network model. The second terminal device receives the information, determines the convolutional neural network model as the channel encoding model in the second terminal device, and determines a corresponding model parameter according to the convolutional neural network model.

In some implementations, an encoding model or a decoding model, such as a logistic regression model, adopted in a node does not require training. In other implementations, an encoding model or a decoding model, such as a convolutional neural network model, adopted in a node requires training, and can be used after training.

Figure 10:
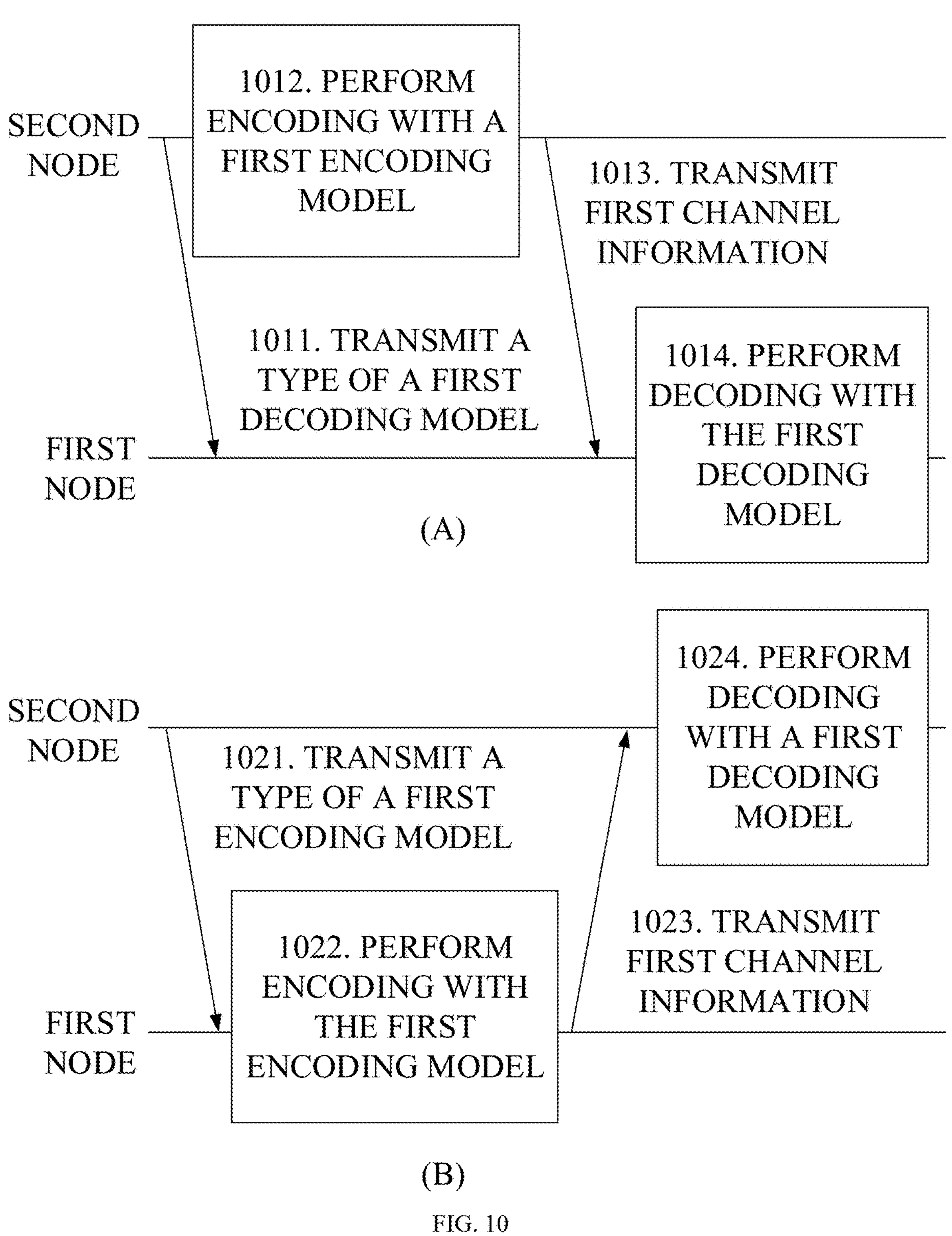
FIG. 10 is a flow chart illustrating a method for information transmission provided in an exemplary implementation of the disclosure.

According to differences between the first model and the second model, there are two optional implementation manners for the method. Exemplarily, as illustrated in FIG. 10 (*a*) and (*b*), for example, the method is applicable for transmission and reception of first channel information.

For example, the first model is a first decoding model, and the second model is a first encoding model. Exemplarily, as illustrated in FIG. 10 (*a*), the method provided in implementations of the disclosure includes the following.

At 1011, a second node transmits a type of the first decoding model to a first node.

At 1012, the second node performs encoding with the first encoding model.

Exemplarily, the second node is provided with the first encoding model.

The second node generates first channel information by encoding to-be-fed back information with the first encoding model.

Exemplarily, the operations at 1011 and 1012 can be performed simultaneously, sequentially, or in no particular order.

At 1013, the second node transmits the first channel information to the first node.

At 1014, the first node performs decoding with the first decoding model.

For example, the first decoding model is a CSI decoding model, and the first encoding model is a CSI encoding model. After the first node receives a type of the CSI decoding model transmitted by the second node, the first node determines a decoding model of a specified type as the CSI decoding model in the first node, and determines a corresponding model parameter of the first model according to the specified model type. The second node generates the first channel information by encoding the to-be-fed back information with the CSI encoding model, and transmits the first channel information to the first node. After the first node determines an adopted decoding model according to the received type of the CSI decoding model, the first node generates feedback channel information by decoding the first channel information.

For example, the first model is a first encoding model, and the second model is a first decoding model. Exemplarily, as illustrated in FIG. 10 (*b*), the method provided in implementations of the disclosure includes the following.

At 1021, the second node transmits a type of the first encoding model to the first node.

At 1022, the first node performs encoding with the first encoding model.

Exemplarily, after the first node receives the type of the first encoding model transmitted by the second node, the first node determines an encoding model of a specified type as the first encoding model in the first node, and determines a corresponding model parameter of the first encoding model according to the specified model type. The model parameter of the first encoding model includes, but is not limited to, at least one of: a structure of a neural network, a network coefficient of the neural network, an algorithm of the neural network, or interface information of the neural network.

The first node generates first channel information by encoding to-be-fed back information with the first encoding model.

At 1023, the first node transmits the first channel information to the second node.

At 1024, the second node performs decoding with the first decoding model.

For example, the first encoding model is a CSI encoding model, and the first decoding model is a CSI decoding model. The first node determines an adopted encoding model according to a received type of the CSI encoding model. The first node generates the first channel information by encoding the to-be-fed back information with the CSI encoding model, and transmits the first channel information to the second node. The second node generates the feedback channel information by decoding the first channel information.

2. The Information of the First Model Includes the Model Parameter of the First Model.

Figure 11:
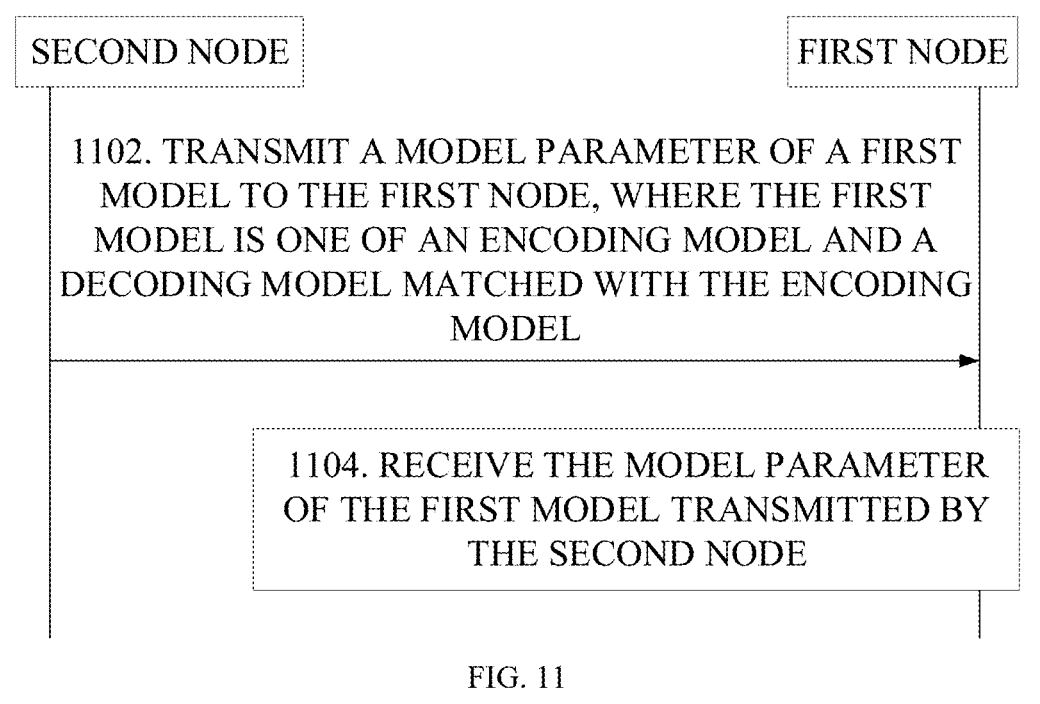

FIG. 11 is a flow chart illustrating a method for information transmission provided in an exemplary implementation of the disclosure. For example, the above method is applicable to a mobile communication system in implementations of the disclosure, where the mobile communication system includes a first node and a second node. The method includes the following.

At 1102, the second node transmits the model parameter of the first model to the first node in the mobile communication system.

Exemplarily, the model parameter of the first model includes, but is not limited to, at least one of: a structure of a neural network, a network coefficient of the neural network, an algorithm of the neural network, or interface information of the neural network.

The structure of the neural network includes layers of a nerve nucleus, etc., for example, the neural network includes an input layer, a hidden layer, and an output layer. The network coefficient of the neural network includes a weight and a coefficient of the nerve nucleus. The algorithm of the neural network includes an algorithm used by the nerve nucleus, an algorithm for up-sampling and down-sampling, an algorithm for a loss function, a training algorithm, etc. The interface information of the neural network includes a type, a quantity, and a format of input information and/or output information.

The above contents are only for illustrative examples and do not limit the model parameter of the first model involved in the disclosure. In the method for information transmission and method for information reception provided in implementations of the disclosure, the contents related to the model parameter of the first model are within the scope of protection of the disclosure.

Exemplarily, the model parameter of the first model is used to determine parameter information of the first model, and the first model is one of an encoding model and a decoding model matched with the encoding model.

Exemplarily, the first node is one of a network device and a terminal device, and the second node is the other of the network device and the terminal device.

Exemplarily, the encoding model and the decoding model matched with the encoding model include, but are not limited to, at least one group of: a CSI encoding model and a CSI decoding model; a channel encoding model and a channel decoding model; a source encoding model and a source decoding model; or a modulation model and a demodulation model.

At 1104, the first node receives the model parameter of the first model transmitted by the second node in the mobile communication system.

Exemplarily, for transmission modes of the model parameter of the first model, reference can be made to the above-mentioned contents, which will not be repeated herein.

For example, the second node is a terminal device, the first node is a network device, and the model parameter of the channel encoding model transmitted from the terminal device to the network device includes the interface information of the neural network. The network device receives the information and determines interface information of a neural network model in the second terminal device.

Figure 12:
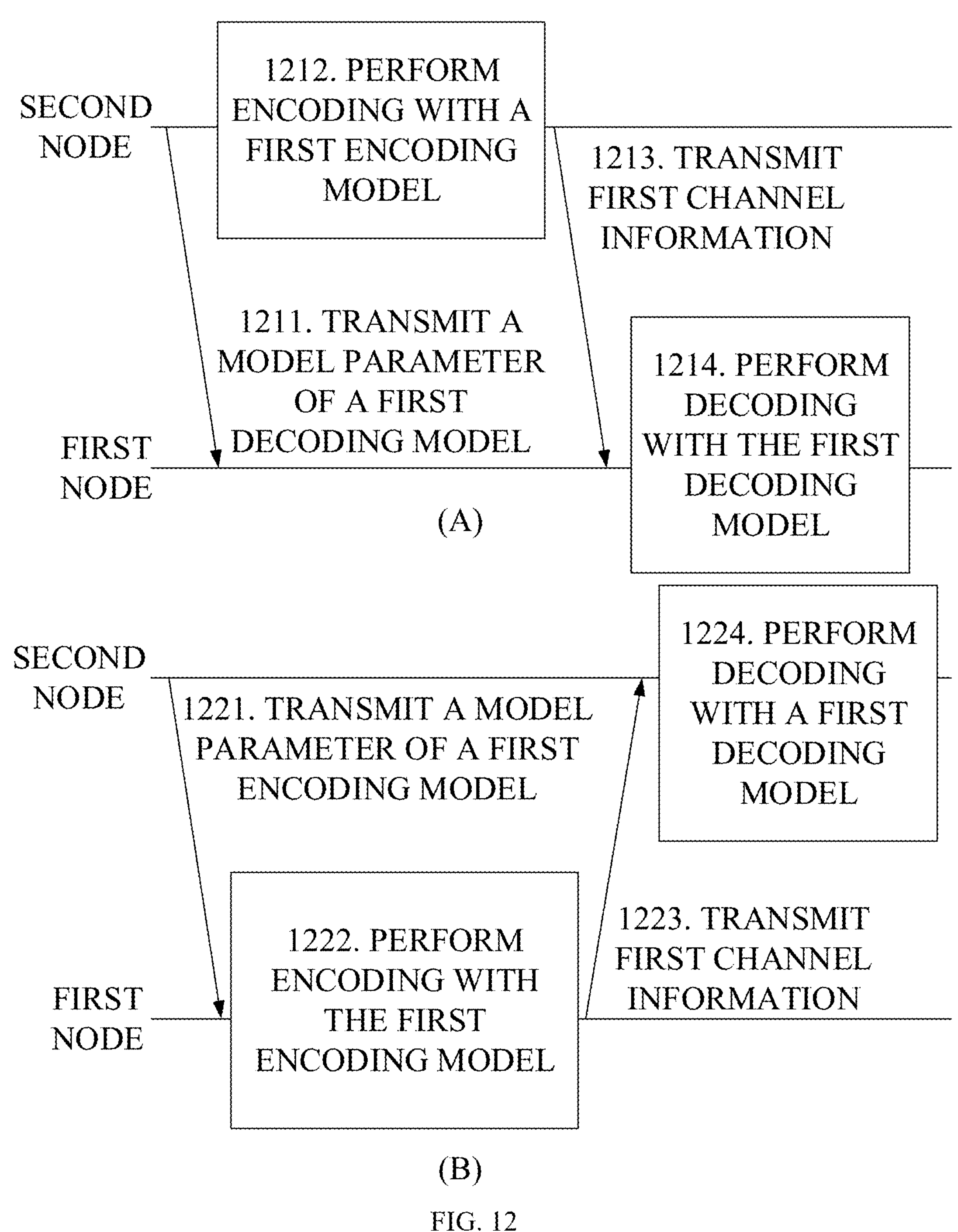
FIG. 12 is a flow chart illustrating a method for information transmission provided in an exemplary implementation of the disclosure.

According to differences between the first model and the second model, there are two optional implementation manners for the method. Exemplarily, as illustrated in FIG. 12 (*a*) and (*b*), for example, the method is applicable for transmission and reception of first channel information.

For example, the first model is a first decoding model, and the second model is a first encoding model. Exemplarily, as illustrated in FIG. 12 (*a*), the method provided in implementations of the disclosure includes the following.

At 1211, a second node transmits a model parameter of the first decoding model to a first node.

At 1212, the second node performs encoding with the first encoding model.

Exemplarily, the second node is provided with the first encoding model.

The second node generates first channel information by encoding to-be-fed back information with the first encoding model.

Exemplarily, the operations at 1211 and 1212 can be performed simultaneously, sequentially, or in no particular order.

At 1213, the second node transmits the first channel information to the first node.

At 1214, the first node performs decoding with the first decoding model.

For example, the first decoding model is a CSI decoding model, and the first encoding model is a CSI encoding model. The second node generates the first channel information by encoding the to-be-fed back information with the CSI encoding model, and transmits the first channel information to the first node. After the first node determines a model parameter of an adopted decoding model according to the received model parameter of the CSI decoding model, the first node generates feedback channel information by decoding the first channel information.

For example, the first model is a first encoding model, and the second model is a first decoding model. Exemplarily, as illustrated in FIG. 12 (*b*), the method provided in implementations of the disclosure includes the following.

At 1221, a second node transmits a model parameter of the first encoding model to a first node.

At 1222, the first node performs encoding with the first encoding model.

Exemplarily, after the first node receives the model parameter of the first encoding model transmitted by the second node, the first node determines a model parameter of an adopted encoding model in the first node, and generates first channel information by encoding to-be-fed back information with the first encoding model.

At 1223, the first node transmits the first channel information to the second node.

At 1224, the second node performs decoding with the first decoding model.

For example, the first encoding model is a CSI encoding model, and the first decoding model is a CSI decoding model. The first node generates the first channel information by encoding the to-be-fed back information according to the model parameter of the CSI encoding model, and transmits the first channel information to the second node. The second node generates feedback channel information by decoding the first channel information.

3. The Information of the First Model Includes the First Model and the Interface Information of the First Model.

Figure 13:
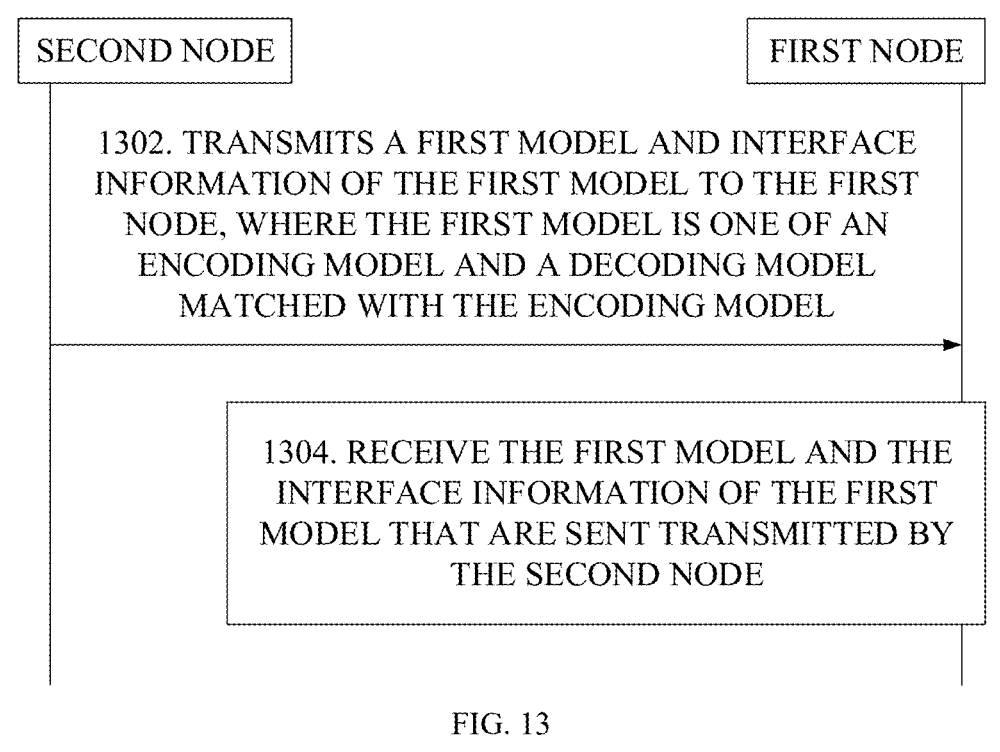

FIG. 13 is a flow chart illustrating a method for information transmission provided in an exemplary implementation of the disclosure. For example, the above method is applicable to a mobile communication system in implementations of the disclosure, where the mobile communication system includes a first node and a second node. The method includes the following.

At 1302, the second node transmits the first model and the interface information of the first model to the first node in the mobile communication system.

Exemplarily, the interface information of the first model is used to determine input information and/or output information of the first model, and the first model is one of an encoding model and a decoding model matched with the encoding model.

The interface information of the first model includes, but is not limited to, at least one of: information of an input interface of the first model or information of an output interface of the first model.

Exemplarily, the information of the input interface of the first model includes dimension information input to the first model, and the information of the output interface includes dimension information output from the first model.

The dimension information input to the first model and the dimension information output from the first model include, but are not limited to, at least one of: a data type, a dimension type, a dimension quantity, a dimension size, a range of each input, a normalization processing method, or a quantization scheme. For example, the first model is a CSI encoding model, and the interface information of the first model is information of an input interface of the CSI encoding model, where the information of the input interface of the CSI encoding model includes a dimension quantity and a dimension size.

Exemplarily, the interface information of the first model is described as follows.

Model input consists of an M*N matrix, and there are M first granularities in a first dimension and N second granularities in a second dimension. M can be equal or unequal to N, and a specific value in the matrix indicates channel quality. In addition, two-dimensional (2D) data of M*N can also be integrated into one-dimensional data of 1*(M*N) or (M*N)*1, or transformed into three-dimensional (3D) data of M*N1*N2 (N=N1*N2) or M1*M2*N (M=M1*M2). The specific transformation can be implemented in the manner of first the first dimension and then the second dimension, or first the second dimension and then the first dimension, where the specific transformations are different in the form of expression.

It should be noted that the matrix elements mentioned above may be real numbers or complex numbers. For example, the model input may be an M*N matrix with complex elements. Alternatively, the model input may be an M*N*2 3D matrix, where M*N data represents a real part of the model input and another M*N data represents an imaginary part of the model input. M or N may be equal to 1.

The above 2D matrix with M rows and N columns, or the 3D matrix with M rows, N columns, and 2 layers can be transformed into a matric or a vector in other dimensions, which will not be specifically limited.

Figure 14:
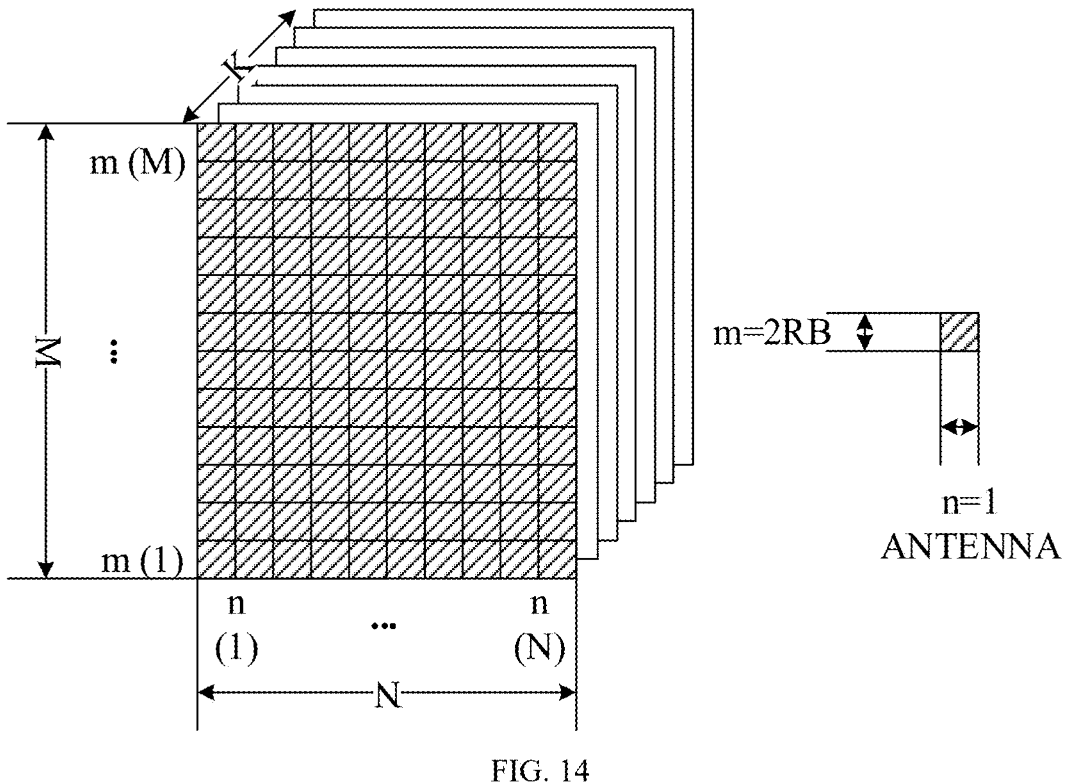
FIG. 14 is a schematic diagram of interface information provided in an exemplary implementation of the disclosure.

Exemplarily, as illustrated in FIG. 14, the interface information of the first model is exemplified as follows.

The model input consists of the first dimension with a granularity of m, where the first dimension may be a frequency-domain dimension. In the case where the first dimension is the frequency-domain dimension, the granularity of m may be a resource blocks (RBs) (a is greater than or equal to 1, such as 2 RBs, 4 RBs, or 8 RBs), or may be b sub-carriers (b is greater than 1, such as 4 sub-carriers, 6 sub-carriers, or 18 sub-carriers). In the case where the first dimension is the frequency-domain dimension, a frequency-domain range indicated by a single sample of a training set is M*m. m is the number of sampling times.

The model input consists of the second dimension with a granularity of n, where the second dimension may be a spatial-domain dimension, specifically an antenna dimension. For example, the second dimension consists of N antennas (or multiple pairs of antennas), and the second granularity is one antenna (or one pair of antennas).

A CQI in a specific dimension combination of the model input represents a channel quality condition in the specific dimension combination. For example, in an M*N matrix, an indication value X in the third row and the sixth column can be used to represent a channel quality condition in the third specific bandwidth of the sixth spatial granularity.

Exemplarily, the first node is one of a network device and a terminal device, and the second node is the other of the network device and the terminal device.

Exemplarily, the encoding model and the decoding model matched with the encoding model include, but are not limited to, at least one group of: a CSI encoding model and a CSI decoding model; a channel encoding model and a channel decoding model; a source encoding model and a source decoding model; or a modulation model and a demodulation model.

At 1304, the first node receives the first model and the interface information of the first model that are transmitted by the second node in the mobile communication system.

Exemplarily, for transmission modes of the first model and the interface information of the first model, reference can be made to the above-mentioned contents, which will not be repeated herein.

For example, the second node is a terminal device, the first node is a network device, the terminal device transmits a channel encoding model and interface information of the channel encoding model to the network device, and the network device receives the channel encoding model and the interface information.

In the mobile communication system, since the first node is different from the second node, there are various specific optional manners for the method for information transmission and the method for information reception provided in implementations of the disclosure. According to different types of nodes, taking transmission and reception of first channel information as an example, various optional implementation manners are provided in implementations of the disclosure. Exemplarily, in the following implementations, the first decoding model is a CSI decoding model, and the first encoding model is a CSI encoding model.

1. The Second Node is a Network Device, and the First Node is a Terminal Device.

Figure 15:
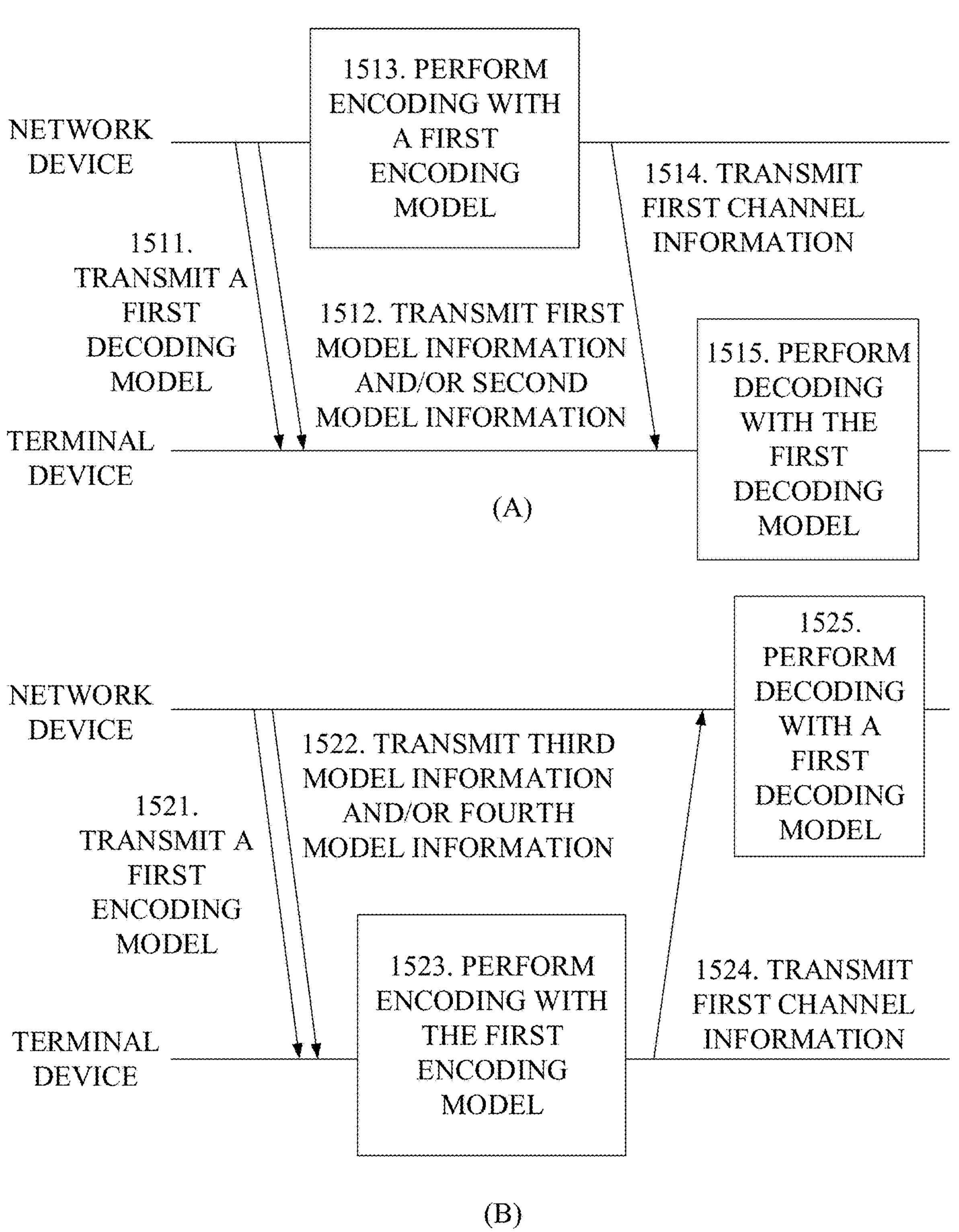
FIG. 15 is a flow chart illustrating a method for information transmission provided in an exemplary implementation of the disclosure.

Exemplarily, as illustrated in FIG. 15 (*a*), for example, a first model is a first decoding model, and a second model is a first encoding model. The method provided in implementations of the disclosure includes the following.

At 1511, the network device transmits the first decoding model to the terminal device.

At 1512, the network device transmits first model information and/or second model information to the terminal device.

Exemplarily, the first model information indicates information of an input interface of the first decoding model, and the second model information indicates information of an output interface of the first decoding model.

Exemplarily, the information of the input interface of the first decoding model includes dimension information input to the first decoding model, and the information of the output interface includes dimension information output from the first decoding model.

The dimension information input to the first decoding model and the dimension information output from the first decoding model include, but are not limited to, at least one of: a data type, a dimension type, a dimension quantity, a dimension size, a range of each input, a normalization processing method, or a quantization scheme.

Exemplarily, the first model information or the second model information is transmitted, or both the first model information and the second model information are transmitted. The first model information and the second model information can be transmitted through the same signaling or through different signaling, which will not be limited herein.

Exemplarily, the operations at 1511 and 1512 can be performed simultaneously, sequentially, or in no particular order.

At 1513, the network device performs encoding with the first encoding model.

Exemplarily, the network device is provided with the first encoding model.

The network device generates first channel information by encoding to-be-fed back information with the first encoding model.

At 1514, the network device transmits the first channel information to the terminal device.

At 1515, the terminal device performs decoding with the first decoding model.

For example, the first decoding model is a CSI decoding model, and the first encoding model is a CSI encoding model. The network device transmits the CSI encoding model and information of an input interface of the CSI encoding model to the terminal device. Meanwhile, the network device generates the first channel information by encoding the to-be-fed back information with the CSI encoding model, and transmits the first channel information to the terminal device. The terminal device generates feedback channel information by decoding the first channel information according to the received information of the input interface of the CSI encoding model.

Exemplarily, as illustrated in FIG. 15 (*b*), for example, the first model is a first encoding model, and the second model is a first decoding model. The method provided in implementations of the disclosure includes the following.

At 1521, the network device transmits the first encoding model to the terminal device.

At 1522, the network device transmits third model information and/or fourth model information to the terminal device.

Exemplarily, the third model information indicates information of an input interface of the first encoding model, and the fourth model information indicates information of an output interface of the first encoding model.

Exemplarily, the information of the input interface of the first encoding model includes dimension information input to the first encoding model, and the information of the output interface includes dimension information output from the first encoding model.

The dimension information input to the first encoding model and the dimension information output from the first encoding model include, but are not limited to, at least one of: a data type, a dimension type, a dimension quantity, a dimension size, a range of each input, a normalization processing method, or a quantization scheme.

Exemplarily, the third model information or the fourth model information is transmitted, or both the third model information and the fourth model information are transmitted. The third model information and the fourth model information can be transmitted through the same signaling or through different signaling, which will not be limited herein.

Exemplarily, the operations at 1521 and 1522 can be performed simultaneously, sequentially, or in no particular order.

At 1523, the terminal device performs encoding with the first encoding model.

After the terminal device receives the first encoding model and the third model information and/or the fourth model information, the terminal device generates first channel information by encoding to-be-fed back information according to specified information of the input interface and/or specified information of the output interface.

At 1524, the terminal device transmits the first channel information to the network device.

At 1525, the network device performs decoding with the first decoding model.

Exemplarily, the network device is provided with the first decoding model. The network device generates feedback channel information by decoding the first channel information with the first decoding model.

2. The Second Node is a Terminal Device, and the First Node is a Network Device.

Figure 16:
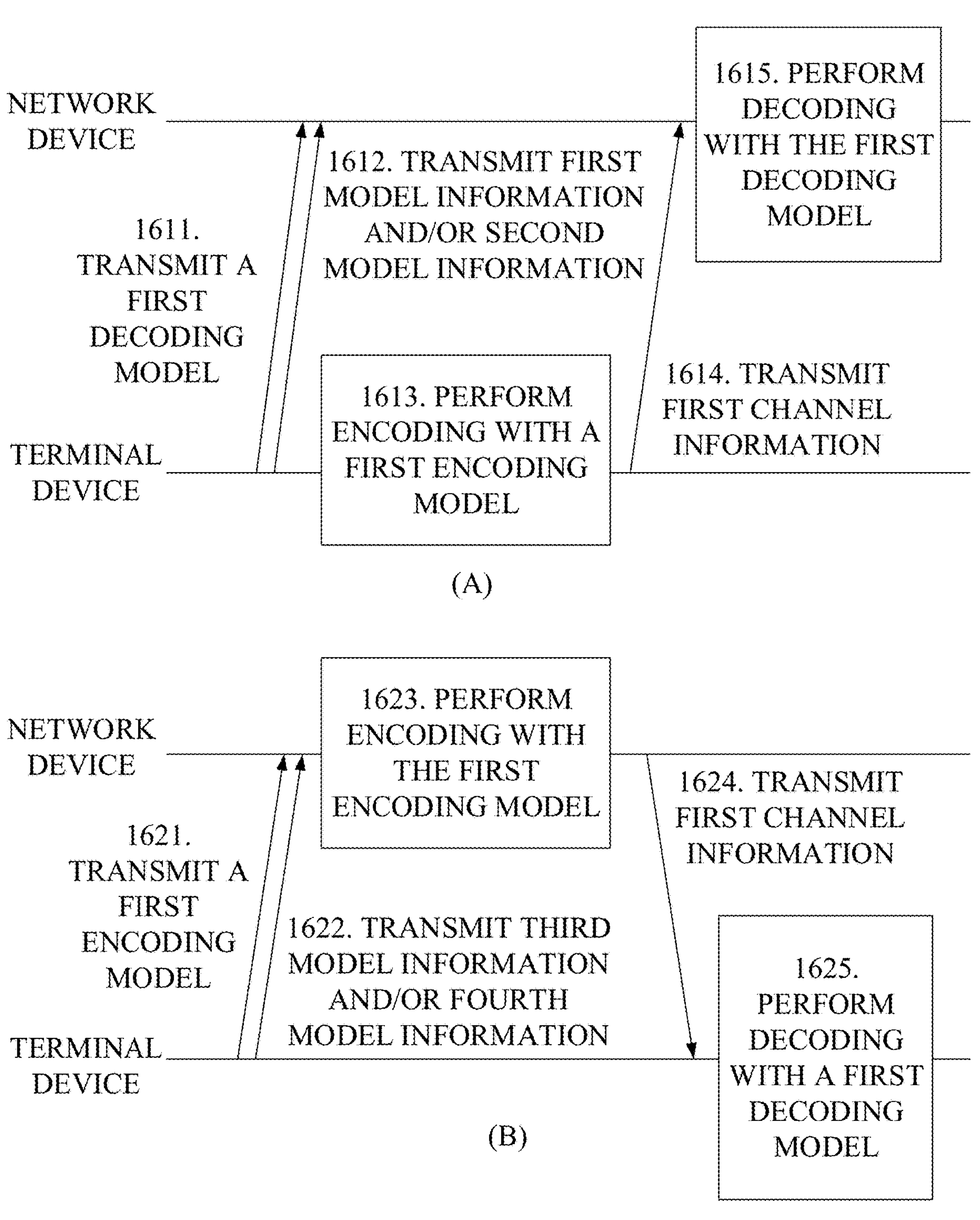
FIG. 16 is a flow chart illustrating a method for information transmission provided in an exemplary implementation of the disclosure.

Exemplarily, as illustrated in FIG. 16 (*a*), for example, a first model is a first decoding model, and a second model is a first encoding model. The method provided in implementations of the disclosure includes the following.

At 1611, the terminal device transmits the first decoding model to the network device.

At 1612, the terminal device transmits first model information and/or second model information to the network device.

Exemplarily, the first model information indicates information of an input interface of the first decoding model, and the second model information indicates information of an output interface of the first decoding model.

Exemplarily, the information of the input interface of the first decoding model includes dimension information input to the first decoding model, and the information of the output interface includes dimension information output from the first decoding model.

The dimension information input to the first decoding model and the dimension information output from the first decoding model include, but are not limited to, at least one of: a data type, a dimension type, a dimension quantity, a dimension size, a range of each input, a normalization processing method, or a quantization scheme.

Exemplarily, the first model information or the second model information is transmitted, or both the first model information and the second model information are transmitted. The first model information and the second model information can be transmitted through the same signaling or through different signaling, which will not be limited herein.

Exemplarily, the operations at 1611 and 1612 can be performed simultaneously, sequentially, or in no particular order.

At 1613, the terminal device performs encoding with the first encoding model.

Exemplarily, the terminal device is provided with the first encoding model.

The terminal device generates first channel information by encoding to-be-fed back information with the first encoding model.

At 1614, the terminal device transmits the first channel information to the network device.

At 1615, the network device performs decoding with the first decoding model.

After the network device receives the first decoding model, and the first model information and/or the second model information, the network device generates feedback channel information by decoding the first channel information received.

Exemplarily, as illustrated in FIG. 16 (*b*), for example, the first model is a first encoding model, and the second model is a first decoding model. The method provided in implementations of the disclosure includes the following.

At 1621, the terminal device transmits the first encoding model to the network device.

At 1622, the terminal device transmits third model information and/or fourth model information to the network device.

Exemplarily, the third model information indicates information of an input interface of the first encoding model, and the fourth model information indicates information of an output interface of the first encoding model.

Exemplarily, the information of the input interface of the first encoding model includes dimension information input to the first encoding model, and the information of the output interface includes dimension information output from the first encoding model.

The dimension information input to the first encoding model and the dimension information output from the first encoding model include, but are not limited to, at least one of: a data type, a dimension type, a dimension quantity, a dimension size, a range of each input, a normalization processing method, or a quantization scheme.

Exemplarily, the third model information or the fourth model information is transmitted, or both the third model information and the fourth model information are transmitted. The third model information and the fourth model information can be transmitted through the same signaling or through different signaling, which will not be limited herein.

Exemplarily, the operations at 1621 and 1622 can be performed simultaneously, sequentially, or in no particular order.

At 1623, the network device performs encoding with the first encoding model.

After the network device receives the first encoding model, and the third model information and/or the fourth model information, the network device generates first channel information by encoding to-be-fed back information according to specified information of the input interface and/or specified information of the output interface.

At 1624, the network device transmits the first channel information to the terminal device.

At 1625, the terminal device performs decoding with the first decoding model.

Exemplarily, the terminal device is provided with the first decoding model. The terminal device generates feedback channel information by decoding the first channel information with the first decoding model.

3. The Second Node is a First Terminal Device, and the First Node is a Second Terminal Device.

Figure 17:
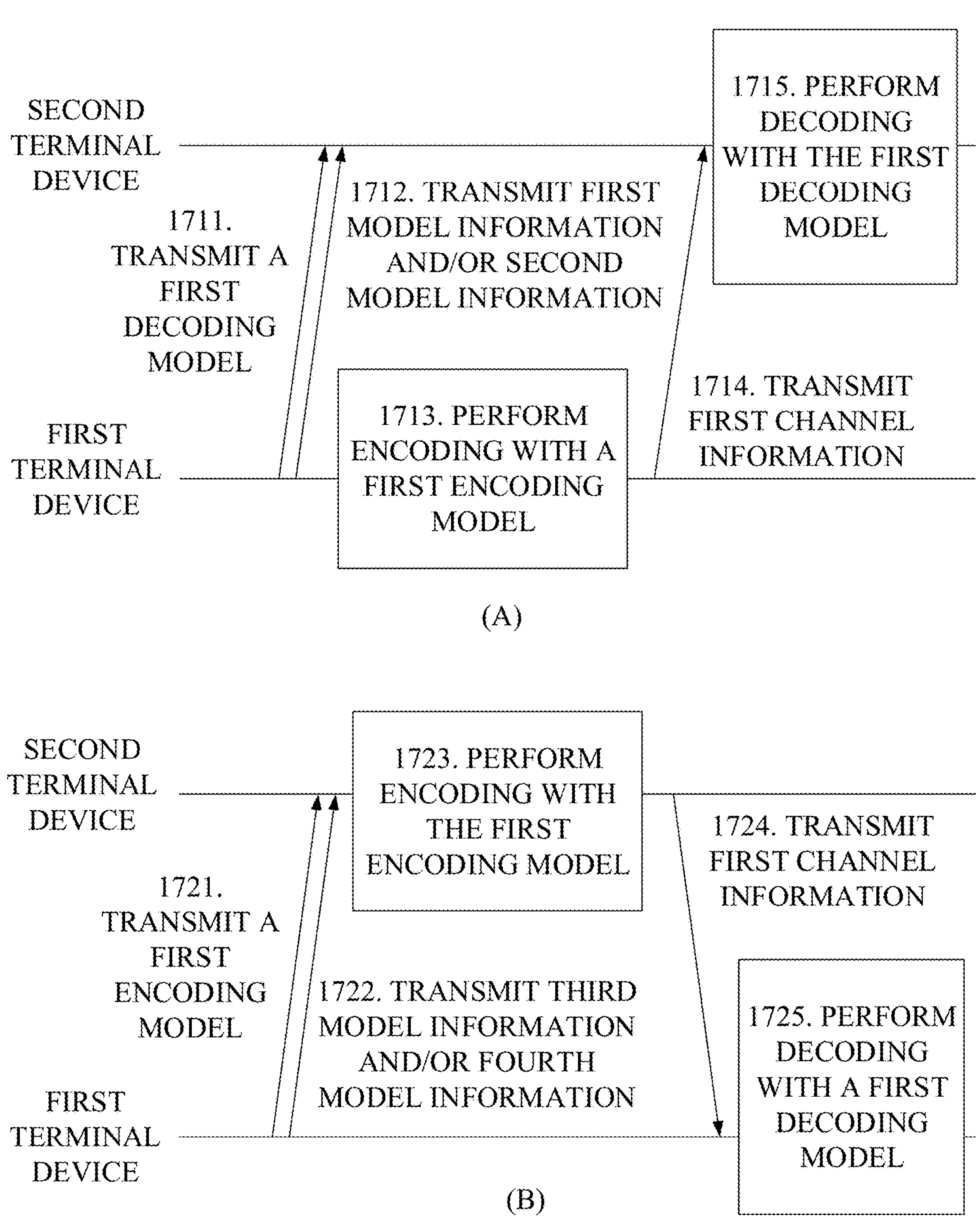
FIG. 17 is a flow chart illustrating a method for information transmission provided in an exemplary implementation of the disclosure.

Exemplarily, as illustrated in FIG. 17 (*a*), for example, a first model is a first decoding model, and a second model is a first encoding model. The method provided in implementations of the disclosure includes the following.

At 1711, the first terminal device transmits the first decoding model to the second terminal device.

At 1712, the first terminal device transmits first model information and/or second model information to the second terminal device.

Exemplarily, the first model information indicates information of an input interface of the first decoding model, and the second model information indicates information of an output interface of the first decoding model.

Exemplarily, the information of the input interface of the first decoding model includes dimension information input to the first decoding model, and the information of the output interface includes dimension information output from the first decoding model.

The dimension information input to the first decoding model and the dimension information output from the first decoding model include, but are not limited to, at least one of: a data type, a dimension type, a dimension quantity, a dimension size, a range of each input, a normalization processing method, or a quantization scheme.

Exemplarily, the first model information or the second model information is transmitted, or both the first model information and the second model information are transmitted. The first model information and the second model information can be transmitted through the same signaling or through different signaling, which will not be limited herein.

Exemplarily, the operations at 1711 and 1712 can be performed simultaneously, sequentially, or in no particular order.

At 1713, the first terminal device performs encoding with the first encoding model.

Exemplarily, the first terminal device is provided with the first encoding model.

The first terminal device generates first channel information by encoding to-be-fed back information with the first encoding model.

At 1714, the first terminal device transmits the first channel information to the second terminal device.

At 1715, the second terminal device performs decoding with the first decoding model.

After the second terminal device receives the first decoding model, and the first model information and/or the second model information, the second terminal device generates feedback channel information by decoding the first channel information received.

Exemplarily, as illustrated in FIG. 17 (*b*), for example, the first model is a first encoding model, and the second model is a first decoding model. The method provided in implementations of the disclosure includes the following.

At 1721, the first terminal device transmits the first encoding model to the second terminal device.

At 1722, the first terminal device transmits third model information and/or fourth model information to the second terminal device.

Exemplarily, the third model information indicates information of an input interface of the first encoding model, and the fourth model information indicates information of an output interface of the first encoding model.

Exemplarily, the information of the input interface of the first encoding model includes dimension information input to the first encoding model, and the information of the output interface includes dimension information output from the first encoding model.

The dimension information input to the first encoding model and the dimension information output from the first encoding model include, but are not limited to, at least one of: a data type, a dimension type, a dimension quantity, a dimension size, a range of each input, a normalization processing method, or a quantization scheme.

Exemplarily, the third model information or the fourth model information is transmitted, or both the third model information and the fourth model information are transmitted. The third model information and the fourth model information can be transmitted through the same signaling or through different signaling, which will not be limited herein.

Exemplarily, the operations at 1721 and 1722 can be performed simultaneously, sequentially, or in no particular order.

At 1723, the second terminal device performs encoding with the first encoding model.

After the second terminal device receives the first encoding model, and the third model information and/or the fourth model information, the second terminal device generates first channel information by encoding to-be-fed back information according to specified information of the input interface and/or specified information of the output interface.

At 1724, the second terminal device transmits the first channel information to the first terminal device.

At 1725, the first terminal device performs decoding with the first decoding model.

Exemplarily, the first terminal device is provided with the first decoding model. The first terminal device generates feedback channel information by decoding the first channel information with the first decoding model.

In summary, with the method for information transmission and the method for information reception provided in implementations of the disclosure, various optional implementation manners are provided according to different contents in the information of the first model. According to the methods provided in implementations of the disclosure, in the mobile communication system, the second node transmits to the first node the type of the first model, the model parameter of the first model, and the first model and the interface information of the first model, so that the first node is provided with the first model that matches the second model set up in the second node. As such, the encoding model and the decoding model matched with the encoding model can be provided for the first node and the second node, respectively, thereby implementing information exchange between the first node and the second node.

Figure 18:
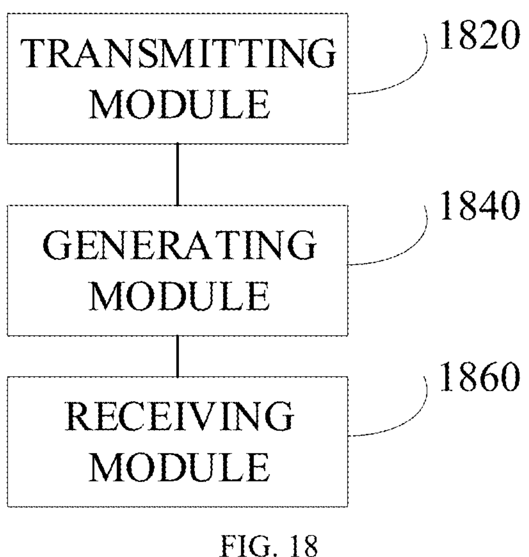
FIG. 18 is a schematic structural diagram of an apparatus for information transmission provided in an exemplary implementation of the disclosure.

FIG. 18 is a schematic structural diagram of an apparatus for information transmission provided in an exemplary implementation of the disclosure. The apparatus can be implemented as a terminal device or part of a terminal device. The apparatus is applicable to a second node in a communication system and includes a transmitting module 1820. The transmitting module 1820 is configured to transmit information of a first model to a first node in the mobile communication system, where the information of the first model is used to set up the first model in the first node. The first model is one of an encoding model and a decoding model matched with the encoding model.

In an optional design of the disclosure, the transmitting module 1820 is further configured to transmit a type of the first model to the first node in the mobile communication system.

In an optional design of the disclosure, the transmitting module 1820 is further configured to transmit a model parameter of the first model to the first node in the mobile communication system.

In an optional design of the disclosure, the model parameter includes at least one of: a structure of a neural network, a network coefficient of the neural network, an algorithm of the neural network, or interface information of the neural network.

In an optional design of the disclosure, the transmitting module 1820 is further configured to transmit the first model and interface information of the first model to the first node in the mobile communication system.

In an optional design of the disclosure, the interface information includes at least one of: information of an input interface of the first model, or information of an output interface of the first model.

In an optional design of the disclosure, the encoding model and the decoding model matched with the encoding model include at least one group of: a CSI encoding model and a CSI decoding model; a channel encoding model and a channel decoding model; a source encoding model and a source decoding model; or a modulation model and a demodulation model.

In an optional design of the disclosure, the second node is provided with a second model, where the second model is the other of the encoding model and the decoding model matched with the encoding model.

In an optional design of the disclosure, the first model is a CSI decoding model, the second model is a CSI encoding model, and the apparatus further includes a generating module 1840. The generating module1840 is configured to generate first channel information by encoding to-be-fed back information with the CSI encoding model. The transmitting module 1820 is further configured to transmit the first channel information to the first node in the mobile communication system.

In an optional design of the disclosure, the first model is a CSI encoding model, the second model is a CSI decoding model, and the apparatus further includes a receiving module 1860. The receiving module 1860 is configured to receive first channel information transmitted by the first node in the mobile communication system, where the first channel information is generated by encoding to-be-fed back channel information with the CSI encoding model. The generating module 1840 is further configured to generate feedback channel information by decoding the first channel information with the CSI decoding model.

Figure 19:
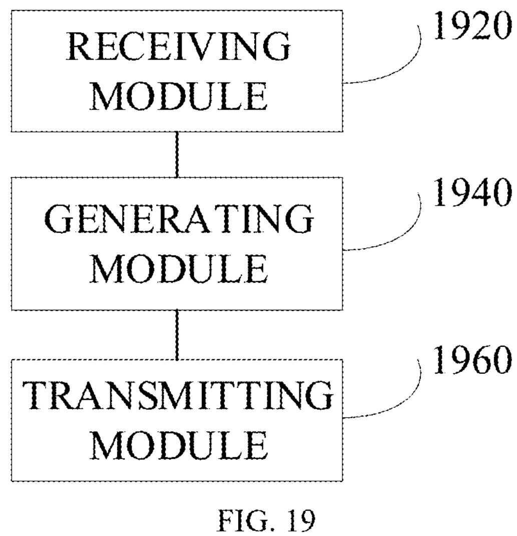
FIG. 19 is a schematic structural diagram of an apparatus for information reception provided in an exemplary implementation of the disclosure.

FIG. 19 is a schematic structural diagram of an apparatus for information reception provided in an exemplary implementation of the disclosure. The apparatus can be implemented as a terminal device or part of a terminal device. The apparatus is applicable to a first node in a communication system and includes a receiving module 1920. The receiving module 1920 is configured to receive information of a first model transmitted by a second node in the mobile communication system, where the information of the first model is used to set up the first model in the first node. The first model is one of an encoding model and a decoding model matched with the encoding model.

In an optional design of the disclosure, the receiving module 1920 is further configured to receive a type of the first model transmitted by the second node in the mobile communication system.

In an optional design of the disclosure, the receiving module 1920 is further configured to receive a model parameter of the first model transmitted by the second node in the mobile communication system.

In an optional design of the disclosure, the model parameter includes at least one of: a structure of a neural network, a network coefficient of the neural network, an algorithm of the neural network, or interface information of the neural network.

In an optional design of the disclosure, the receiving module 1920 is further configured to receive the first model and interface information of the first model that are transmitted by the second node in the mobile communication system.

In an optional design of the disclosure, the interface information includes at least one of: information of an input interface of the first model, or information of an output interface of the first model.

In an optional design of the disclosure, the encoding model and the decoding model matched with the encoding model include at least one group of: a CSI encoding model and a CSI decoding model; a channel encoding model and a channel decoding model; a source encoding model and a source decoding model; or a modulation model and a demodulation model.

In an optional design of the disclosure, the second node is provided with a second model, where the second model is the other of the encoding model and the decoding model matched with the encoding model.

In an optional design of the disclosure, the first model is a CSI decoding model, the second model is a CSI encoding model, and the apparatus further includes a generating module 1940. The receiving module 1920 is further configured to receive first channel information transmitted by the second node in the mobile communication system, where the first channel information is generated by encoding to-be-fed back channel information with the CSI encoding model. The generating module 1940 is configured to generate feedback channel information by decoding the first channel information with the CSI decoding model.

In an optional design of the disclosure, the first model is a CSI encoding model, the second model is a CSI decoding model, and the apparatus further includes a transmitting module 1960. The generating module 1940 is further configured to generate first channel information by encoding to-be-fed back information with the CSI encoding model. The transmitting module 1960 is configured to transmit the first channel information to the second node in the mobile communication system.

Figure 20:
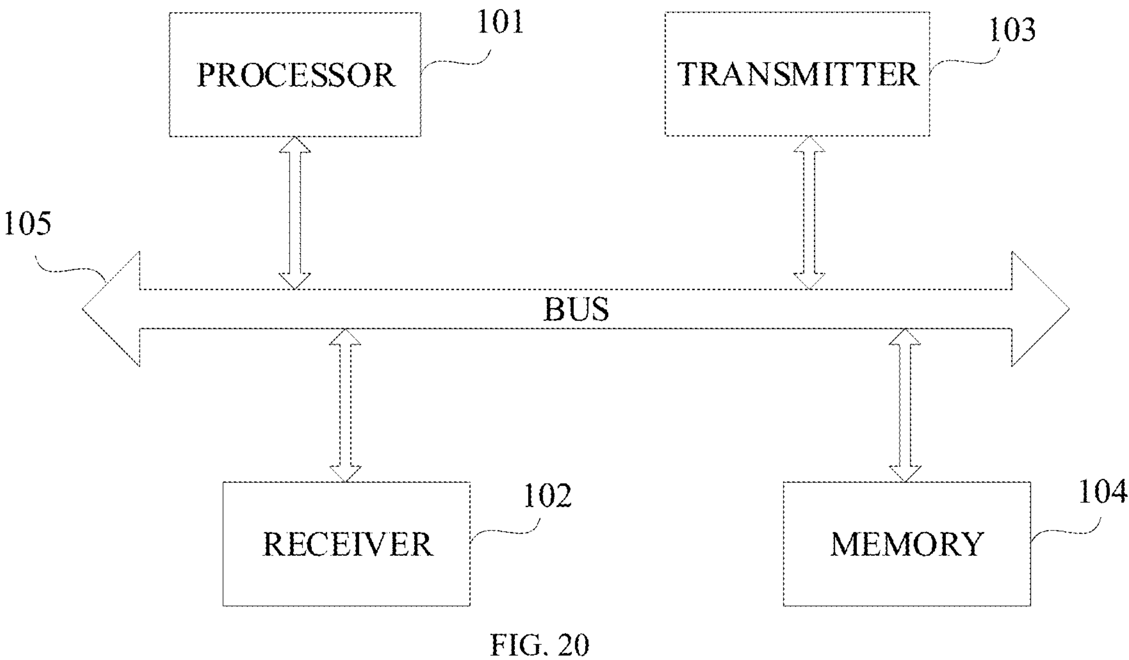
FIG. 20 is a block diagram of a communication device provided in an exemplary implementation of the disclosure.

FIG. 20 is a block diagram of a communication device (a terminal device or a network device) provided in an exemplary implementation of the disclosure. The communication device includes a processor 101, a receiver 102, a transmitter 103, a memory 104, and a bus 105.

The processor 101 includes one or more processing cores and is configured to perform various functional applications and information processing by executing software programs and modules.

The receiver 102 and the transmitter 103 may be implemented as one communication component, where the communication component may be a communication chip.

The memory 104 is coupled with the processor 101 via the bus 105.

The memory 104 is configured to store at least one instruction, and the processor 101 is configured to execute the at least one instruction to implement the various operations in the method for information transmission and/or the method for information reception mentioned in the foregoing method implementations.

In addition, the memory 104 may be implemented as a volatile or a non-volatile storage device or a combination thereof, where the volatile or a non-volatile storage device includes, but is not limited to, a magnetic disc or an optical disc, an electrically-erasable programmable read-only memory (EEPROM), an erasable programmable read-only memory (EPROM), a static random access memory (SRAM), a read-only memory (ROM), a magnetic memory, a flash memory, or a programmable read-only memory (PROM).

In an exemplary implementation, a terminal device is further provided. The terminal device includes a processor, a transceiver coupled with the processor, and a memory configured to store executable instructions for the processor. The processor is configured to load and execute the executable instructions to implement the method for information transmission and/or the method for information reception in the above aspects.

In an exemplary implementation, a network device is further provided. The network device includes a processor, a transceiver coupled with the processor, and a memory configured to store executable instructions for the processor. The processor is configured to load and execute the executable instructions to implement the method for information transmission and/or the method for information reception in the above aspects.

In an exemplary implementation, a computer-readable storage medium is further provided. The computer-readable storage medium is configured to store executable instructions which are loaded and executed by a processor to implement the method for information transmission and/or the method for information reception in the above aspects.

In an exemplary implementation, a chip is further provided. The chip includes programmable logic circuits or programs and is configured to implement the method for information transmission and/or the method for information reception in the above aspects.

In an exemplary implementation, a computer program product is further provided. The computer program product, when run on a processor of a computer device, enables the computer device to implement the method for information transmission and/or the method for information reception in the above aspects.

It will be understood by those of ordinary skills in the art that all or part of the above implementations may be accomplished by means of hardware or a program instructing associated hardware, and the program may be stored in a computer-readable storage medium which may be an ROM, a magnetic disc, or an optical disc.

The above are merely optional implementations of the disclosure and are not intended to limit the disclosure. Any modification, equivalent arrangements, and improvement made within the spirit and principles of the disclosure shall be included in the scope of protection of the disclosure.

What is claimed is:

1. A method for information transmission, applicable to a second node in a mobile communication system and comprising:

transmitting information of a first model to a first node in the mobile communication system, wherein the second node is provided with a second model, and the information of the first model is used by the first node to set up in the first node the first model matched with the second model;

wherein the first model is a decoding model, and the second model is an encoding model matched with the decoding model; or the first model is an encoding model, and the second model is a decoding model matched with the encoding model.

2. The method of claim 1, wherein transmitting the information of the first model to the first node in the mobile communication system comprises:

transmitting a type of the first model to the first node in the mobile communication system.

3. The method of claim 1, wherein transmitting the information of the first model to the first node in the mobile communication system comprises:

transmitting a model parameter of the first model to the first node in the mobile communication system.

4. The method of claim 3, wherein the model parameter comprises a network coefficient of a neural network;

wherein the network coefficient of the neural network comprises a weight and a coefficient of a nerve nucleus of the neural network.

5. The method of claim 3, wherein the model parameter comprises interface information of the first model, wherein the interface information of the first model comprises information of an input interface of the first model and information of an output interface of the first model;

wherein the information of the input interface of the first model comprises dimension information input to the first model, and the information of the output interface of the first model comprises dimension information output from the first model;

wherein the dimension information input to the first model and the dimension information output from the first model comprises at least one of: a data type, a dimension type, a dimension quantity, a dimension size, a range of each input, a normalization processing method, and a quantization scheme.

6. The method of claim 3, wherein the model parameter comprises at least one of:

a structure of a neural network;

a network coefficient of the neural network;

an algorithm of the neural network; and interface information of the neural network.

7. The method of claim 1, wherein transmitting the information of the first model to the first node in the mobile communication system comprises:

transmitting the first model and interface information of the first model to the first node in the mobile communication system.

8. The method of claim 7, wherein the interface information comprises at least one of:

information of an input interface of the first model; and information of an output interface of the first model.

9. The method of claim 1, wherein the encoding model and the decoding model matched with the encoding model comprise at least one group of:

a channel state information (CSI) encoding model and a CSI decoding model;

a channel encoding model and a channel decoding model;

a source encoding model and a source decoding model; and a modulation model and a demodulation model.

10. The method of claim 1, wherein the first model is a CSI decoding model, the second model is a CSI encoding model, and the method further comprises:

generating first channel information by encoding to-be-fed back information with the CSI encoding model; and transmitting the first channel information to the first node in the mobile communication system.

11. The method of claim 1, wherein the first model is a CSI encoding model, the second model is a CSI decoding model, and the method further comprises:

receiving first channel information transmitted by the first node in the mobile communication system, wherein the first channel information is generated by encoding to-be-fed back channel information with the CSI encoding model; and generating feedback channel information by decoding the first channel information with the CSI decoding model.

12. A second node, the second node being in a mobile communication system and comprising:

a transceiver;

a processor coupled with the transceiver; and a memory storing a computer program;

wherein the processor being configured to execute the computer program to cause the transceiver to:

transmit information of a first model to a first node in the mobile communication system, wherein the second node is provided with a second model, and the information of the first model is used by the first node to set up in the first node the first model matched with the second model;

wherein the first model is a decoding model, and the second model is an encoding model matched with the decoding model; or the first model is an encoding model, and the second model is a decoding model matched with the encoding model.

13. The second node of claim 12, wherein the processor is further configured to execute the computer program to cause the transceiver to:

transmit a model parameter of the first model to the first node in the mobile communication system.

14. The second node of claim 12, wherein the processor is further configured to execute the computer program to cause the transceiver to:

transmit the first model and interface information of the first model to the first node in the mobile communication system.

15. The second node of claim 12, wherein the first model is a channel state information (CSI) decoding model, and the second model is a CSI encoding model;

wherein the processor is further configured to execute the computer program to generate first channel information by encoding to-be-fed back information with the CSI encoding model; and wherein the processor is further configured to execute the computer program to cause the transceiver to transmit the first channel information to the first node in the mobile communication system.

16. The second node of claim 12, wherein the first model is a CSI encoding model, and the second model is a CSI decoding model;

wherein the processor is further configured to execute the computer program to cause the transceiver to receive first channel information transmitted by the first node in the mobile communication system, wherein the first channel information is generated by encoding to-be-fed back channel information with the CSI encoding model; and wherein the processor is further configured to execute the computer program to generate feedback channel information by decoding the first channel information with the CSI decoding model.

17. A first node, the first node being in a mobile communication system and comprising:

a transceiver;

a processor coupled with the transceiver; and a memory storing a computer program;

wherein the processor is configured to execute the computer program to cause the transceiver to:

receive information of a first model transmitted by a second node in the mobile communication system, wherein the information of the first model is used by the first node to set up in the first node the first model matched with a second model in the second node;

wherein the processor is further configured to execute the computer program to:

set up in the first node the first model according to the information of the first model;

wherein the first model is a decoding model, and the second model is an encoding model matched with the decoding model; or the first model is an encoding model, and the second model is a decoding model matched with the encoding model.

18. The first node of claim 17, wherein the processor is further configured to execute the computer program to cause the transceiver to:

receive a type of the first model transmitted by the second node in the mobile communication system.

19. The first node of claim 17, wherein the processor is further configured to execute the computer program to cause the transceiver to:

receive a model parameter of the first model transmitted by the second node in the mobile communication system.

20. The first node of claim 17, wherein the processor is further configured to execute the computer program to cause the transceiver to:

receive the first model and interface information of the first model that are transmitted by the second node in the mobile communication system.

* * * * *